United States Patent
Fotedar et al.

(10) Patent No.: US 11,914,923 B1
(45) Date of Patent: Feb. 27, 2024

(54) COMPUTER SYSTEM-BASED PAUSING AND RESUMING OF NATURAL LANGUAGE CONVERSATIONS

(71) Applicant: Amazon Technologies, Inc., Seattle, WA (US)

(72) Inventors: Shiveesh Fotedar, Santa Clara, CA (US); Saurabh Rathi, San Francisco, CA (US); Steven Bishop, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 203 days.

(21) Appl. No.: 17/547,556

(22) Filed: Dec. 10, 2021

(51) Int. Cl.
 *G06F 3/16* (2006.01)
 *G06F 3/0481* (2022.01)
 *G10L 15/22* (2006.01)

(52) U.S. Cl.
 CPC ............ *G06F 3/167* (2013.01); *G06F 3/0481* (2013.01); *G10L 15/22* (2013.01)

(58) Field of Classification Search
 USPC ..................................................... 704/1–504
 See application file for complete search history.

(56) References Cited

U.S. PATENT DOCUMENTS

| | | | | |
|---|---|---|---|---|
| 10,043,516 B2* | 8/2018 | Saddler | ................... | G06F 3/165 |
| 10,528,977 B1* | 1/2020 | Jogia | ....................... | G06F 3/167 |
| 10,896,439 B1* | 1/2021 | Jogia | .................. | G06Q 30/0242 |
| 11,295,745 B1* | 4/2022 | Roy | ......................... | G10L 15/30 |
| 11,526,368 B2* | 12/2022 | Karashchuk | ............ | G06F 9/453 |
| 11,532,306 B2* | 12/2022 | Kim | ......................... | G10L 15/18 |
| 11,538,469 B2* | 12/2022 | Acero | ........................ | G06F 3/16 |
| 11,550,542 B2* | 1/2023 | Stasior | .................... | G06F 3/167 |
| 11,579,841 B1* | 2/2023 | Eich | ....................... | G06F 9/4881 |
| 11,580,990 B2* | 2/2023 | Paulik | ..................... | G10L 15/07 |
| 11,599,331 B2* | 3/2023 | Newendorp | ............ | G10L 15/22 |

(Continued)

OTHER PUBLICATIONS

"Dialog Management with Alexa Conversations," Alexa, Available Online at: https://developer.amazon.com/en-US/alexa/alexa-skills-kit/dialog-management, 2021, 4 pages.

(Continued)

*Primary Examiner* — Marcus T Riley
(74) *Attorney, Agent, or Firm* — Kilpatrick Townsend & Stockton LLP

(57) ABSTRACT

Techniques for computer system-based conversations are described. In an example, a system receives, from a first device, first data corresponding to a first interaction in a conversation that requests a function. The system causes the first device to output a first response to the first interaction. Prior to an execution of the function, the system determines that the conversation is to be paused and causes the first device to output a first indication that the conversation is paused. Upon determining that the conversation is to be resumed, the system causes a second device to output a second indication that the conversation is resumed. The second device can be the same or different from the first device. The system receives, from the second device, second data corresponding to a second interaction in the conversation and causes the execution of the function based at least in part on the second data.

20 Claims, 13 Drawing Sheets

(56) References Cited

U.S. PATENT DOCUMENTS

| | | | | |
|---|---|---|---|---|
| 11,630,525 | B2* | 4/2023 | Hindi | G10L 25/78 |
| | | | | 345/156 |
| 11,638,059 | B2* | 4/2023 | Hansen | H04N 21/44227 |
| | | | | 725/80 |
| 11,656,884 | B2* | 5/2023 | Radebaugh | G06F 16/3329 |
| | | | | 715/708 |
| 11,657,813 | B2* | 5/2023 | Peterson | G10L 17/00 |
| | | | | 704/275 |
| 11,657,820 | B2* | 5/2023 | Kudurshian | G06F 3/167 |
| | | | | 704/257 |
| 11,665,013 | B1* | 5/2023 | Bajaj | G06F 1/3287 |
| | | | | 709/231 |
| 11,670,289 | B2* | 6/2023 | Gruber | G06F 40/205 |
| | | | | 704/235 |
| 11,675,491 | B2* | 6/2023 | Meyer | G06F 3/167 |
| | | | | 715/710 |
| 11,675,829 | B2* | 6/2023 | Graham | G06F 3/167 |
| | | | | 704/270 |
| 11,696,060 | B2* | 7/2023 | Gong | H04R 1/1016 |
| | | | | 381/74 |
| 11,705,130 | B2* | 7/2023 | York | G06F 3/167 |
| | | | | 704/233 |
| 11,710,482 | B2* | 7/2023 | Garcia | G06F 3/167 |
| | | | | 704/275 |
| 11,749,275 | B2* | 9/2023 | Walker, II | G10L 13/02 |
| | | | | 704/257 |
| 11,755,276 | B2* | 9/2023 | Sinesio | G06F 3/167 |
| | | | | 704/275 |
| 11,765,209 | B2* | 9/2023 | Hansen | H04L 65/4015 |
| | | | | 709/204 |
| 11,769,506 | B1* | 9/2023 | Thakare | G10L 15/22 |
| | | | | 704/257 |
| 2014/0074454 | A1* | 3/2014 | Brown | G10L 15/08 |
| | | | | 704/235 |
| 2017/0336960 | A1* | 11/2017 | Chaudhri | H04L 51/18 |
| 2018/0090143 | A1* | 3/2018 | Saddler | G10L 13/02 |
| 2020/0034033 | A1* | 1/2020 | Chaudhri | G06F 3/04842 |
| 2021/0375272 | A1* | 12/2021 | Madwed | G06F 3/167 |
| 2022/0093093 | A1* | 3/2022 | Krishnan | G06V 40/161 |
| 2022/0093094 | A1* | 3/2022 | Krishnan | G06V 40/10 |
| 2022/0093101 | A1* | 3/2022 | Krishnan | G10L 15/063 |

OTHER PUBLICATIONS

"Manage the Skill Session and Session Attributes," Alexa Skill Kit, Available Online at: https://developer.amazon.com/en-US/docs/alexa/custom-skills/manage-skill-session-and-session-attributes.html, 5 pages.

"Multi-Agent Design Guide," Amazon.com, Available Online at: https://urldefense.com/v3/_https:/developer.amazon.com/en-US/alexa/voice-interoperability/design-guide_;!!NknhfzgzgQ!jTNjMjryHHDR1tc_VPKJZryxzrG9TYTQ5kueCc6Cw-puiTqlrBhLw2K7zcezyPRNKXTHGg$, 36 pages.

Cho, "Make it Easier for Customers to Pick Up Where They Left Off with Skill Resumption," Alexa, Available Online at: https://developer.amazon.com/en-US/blogs/alexa/alexa-skills-kit/2020/07/make-it-easier-for-customers-to-pick-up-where-they-left-off-with-skill-resumption, Jul. 22, 2020, 4 pages.

Meyer, "Introducing Alexa Conversations (beta), a New AI-Driven Approach to Providing Conversational Experiences That Feel More Natural," Alexa, Available Online at: https://developer.amazon.com/en-US/blogs/alexa/alexa-skills-kit/2020/07/introducing-alexa-conversations-beta-a-new-ai-driven-approach-to-providing-conversational-experiences-that-feel-more-natural, Jul. 22, 2020, 3 pages.

Walker, "Alexa Custom Assistant UX: An interview between Mark Mattione, UX Designer, and Arianne Walker, Chief Evangelist, Alexa Auto," Alexa, Available Online at: https://developer.amazon.com/en-US/blogs/alexa/alexa-auto/2021/06/alexa-custom-assistant-ux--an-interview-between-mark-mattione--u, Jun. 24, 2021, 3 pages.

* cited by examiner

US 11,914,923 B1

COMPUTER SYSTEM-BASED PAUSING AND RESUMING OF NATURAL LANGUAGE CONVERSATIONS

BACKGROUND

Different modalities are available to control devices. An example modality is touch and relies on graphical user interfaces. Another example modality is vocal and relies on a voice user interface. Voice-based modalities can employ what is referred to as near-field voice recognition, in which a user speaks into a microphone located on a hand-held device. Other voice-based modality systems employ far-field voice recognition, in which a user can speak to a device while the user is within the general vicinity of the device, e.g., within the same room but not necessarily in close proximity to or even facing the device. Systems can implement one or both modalities.

BRIEF DESCRIPTION OF THE DRAWINGS

Various embodiments in accordance with the present disclosure will be described with reference to the drawings, in which.

DETAILED DESCRIPTION

Figure 1:
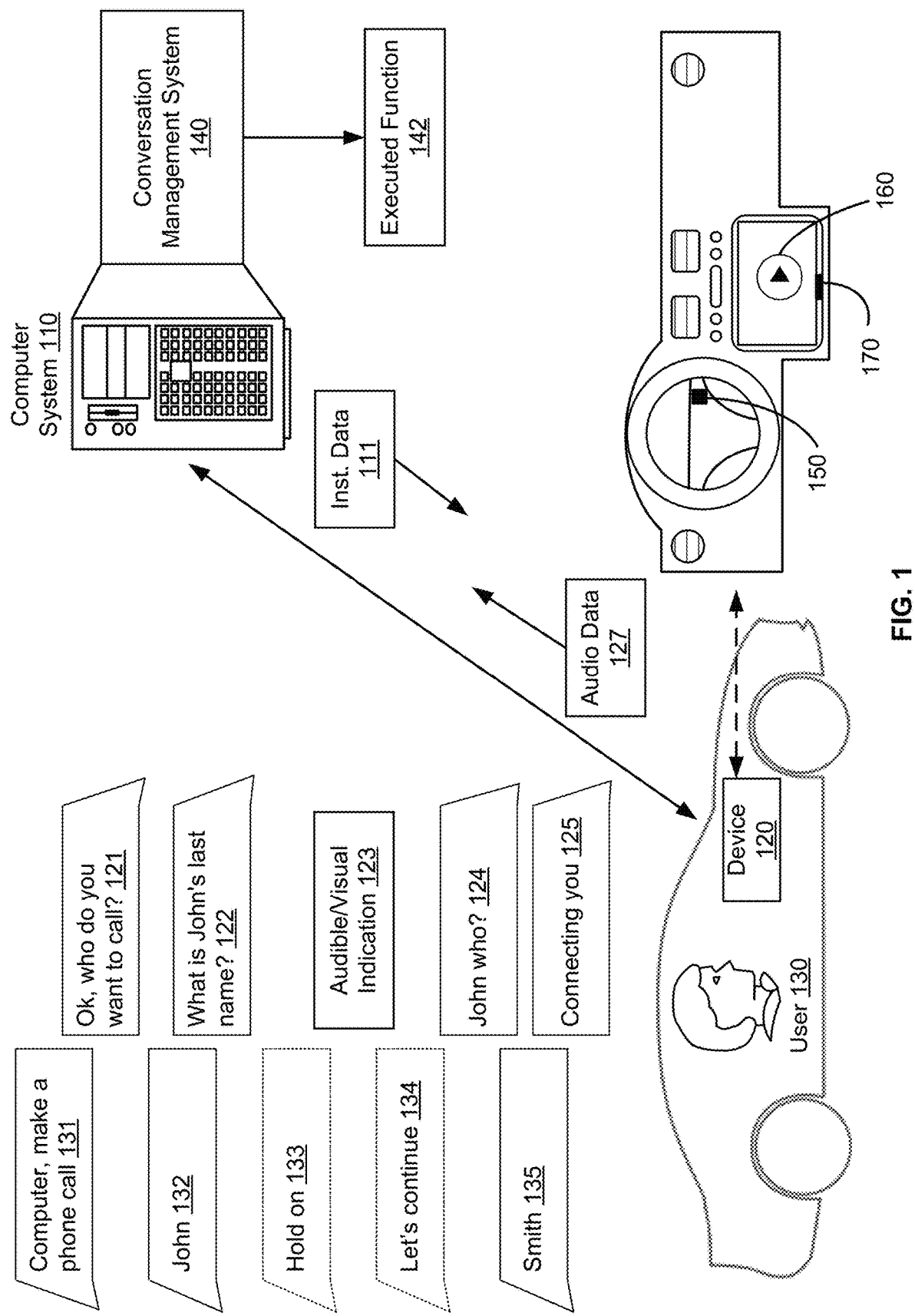
FIG. 1 illustrates an example of interactions in a natural language conversation and pausing and resuming of the natural language conversation, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of present disclosure are directed to, among other things, computer system-based pausing and resuming of natural language conversations. In an example, a computer system is communicatively coupled with a set of devices that are associated with an account. A first device of the set of devices can be operated by a user and can send first data to the computer system and receive second data from the computer system. The first data can correspond to natural language inputs received at the first device, whereas the second data can correspond to natural language outputs of the computer system in response to the natural language inputs. The natural language inputs and outputs can represent a natural language conversation between the user and the computer system (e.g., via the first device) and can be associated with the natural language conversation. The natural language conversation may relate to a request for a function to be executed. The inputs and outputs can indicate at least a parameter of the function prior to an execution of the function. Upon determining a trigger to pause the natural language conversation and prior to a value of the parameter being indicated and, as such, prior to the execution of the function, the computer system can send third data to the first device indicating the pausing. The third data can cause the first device to present an indication that the natural language conversation is paused. The computer system can also store contextual data associated with the natural language conversation. Upon determining a trigger to resume the natural language conversation and before the function is executed, the computer system can send fourth data to a second device of the set of devices indicating the resuming. The second device may be, but need not be, the same as the first device. The fourth data can include at least a portion of the contextual data, where this portion can represent, for instance, the last requested parameter for which no value has been received yet. The fourth data can cause the second device to present an output indicating that the natural language conversation is resumed, where this output can request the value. Upon receiving the values of the different parameters, the computer system can cause the execution of the function and can send fifth data to the second device indicating the execution.

To illustrate, consider an example of an online application for ordering pizza. The first device may receive, via a microphone, a first natural language utterance for ordering a pizza (e.g., "Computer, please order me a pizza"). First audio data representing this utterance is sent to the computer system that, in turn, processes the first audio data via speech processing. The computer determines an intent (e.g., pizza order) and the online application associated with the intent. The computer system also determines parameters of the online application for which values are needed (e.g., type of pizza, pizza toppings, order time, delivery time, etc.). Based on an interaction model that controls the natural language conversation of using the online application, the computer system returns, to the first device, second data indicating a response (e.g., "What would you like to order?"). The first device presents the response via a speaker. Next, a second natural language utterance (e.g., "I would like a medium pizza") is received by the first device and corresponding third audio data is sent to the computer system. Here, upon the speech processing of the third audio data, the computer system determines a token (e.g., "Medium") that corresponds to one of the values. Based on the interaction model, the computer system returns, to the first device, fourth data indicating a response (e.g., "Would you like a vegetarian pizza"). Rather than receiving an answer to this question, the first device receives a third natural language utterance to pause the natural language conversation (e.g., "hold on"). Upon the speech processing of the corresponding audio data, the computer system determines an explicit trigger to pause the natural language conversation. Upon this trigger detection, the computer system causes the natural language conversation to be paused, stores contextual information indicating a state of the interaction model and the last requested parameter (e.g., vegetarian pizza) and sends to the first device a response. This response causes the first device to present a graphical user interface (GUI) component. The GUI component can identify the online application and the pausing and can be selected to resume the pizza ordering. Upon a selection of the GUI component, the first device sends fifth data indicating an explicit trigger to resume the natural language conversation. Upon receiving the fifth data, the computer system determines, from the contextual data, the last requested parameter and generates, based on the state of the interaction model, another response (e.g., "Remind me, would you like a meatless pizza?"). Sixth data corresponding to this response is sent to the first device causing it to present, via its speaker, the response and to dismiss the GUI component. The natural language conversation is resumed. Upon determining the values of the various parameters, the computer system sends these values to a computing component that hosts the online application, thereby causing the computing component to execute the online application based on the values. Seventh data indicating the execution is sent to the first device that can accordingly present a response (e.g., "Your pizza is on its way").

As one skilled in the art will appreciate in light of this disclosure, embodiments of the present disclosure achieves technological advantages. For example, the technological advantages include improvements to the overall user experience with regard to natural language conversations via a device. In particular, the embodiments enable a more natural-like user experience by supporting the pausing and resuming of a natural language conversation without the loss of contextual data associated with such a conversation. In a further example, the technological advantages include improvements to the underlying data processing. In particular, by storing and using contextual data associated with the pausing of the natural language conversation, the amount of data that needs to be processed upon the resuming can be reduced. That is because the natural language conversation need not be restarted and is instead resumed from the point at which it was paused. As such, the relevant data that was already processed up to the pausing point can be used after the resuming and need not be requested and re-processed again.

Certain embodiments of the present disclosure may involve storing and using interaction data associated with a person or device. Storage and/or use of such interaction data may be controlled by a user using privacy controls associated with a speech-controlled device and/or a companion application associated with a speech-controlled device. Accordingly, users may opt out of storage of interaction data and/or may select particular types of interaction data that may be stored while preventing aggregation and storage of other types of interaction data. Additionally, aggregation, storage, and use of interaction data, as described herein, may be compliant with privacy controls, even if not technically subject to them, to bolster user trust. For example, interaction and other data described herein may be treated as if it fell under acts and regulations, such as the Health Insurance Portability and Accountability Act (HIPAA) and the General Data Protection Regulation (GDPR), even if it does not actually fall under these acts and regulations.

FIG. 1 illustrates an example of interactions in a natural language conversation and pausing and resuming of the natural language conversation, according to embodiments of the present disclosure. In the illustration, a computer system 110 is communicatively coupled with a device 120. The device 120 is available to a user 130, where natural language inputs (e.g., natural language utterances of the user 130) are received and processed by the device 120 to generate and send data (e.g., audio data) to the computer system 110. The computer system 110 provides a conversation management system 140 that can at least process the received data and send instruction data back to the device 120 to present natural language outputs (e.g., natural language responses). The natural language inputs and the natural language outputs form at least parts of the natural language conversation.

Although FIG. 1 illustrates that the device 120 is located in a vehicle, embodiments of the present disclosure are not limited as such. As further described in the next figures, other types of devices are possible. Being located in the vehicle 120 can be via a permanent installation (e.g., the device 120 is a component of the vehicle's infotainment system) or a temporary coupling of the device 120 (e.g., via a data connection) with a component of the vehicle (e.g., with the infotainment system). Furthermore, although components of the conversation management system 140 are described as being included in the computer system 110, some of these components can be included in the device (e.g., in a distributed architecture implementation) or all these components can be included in the device (e.g., in a local device architecture implementation). Such components are further described in the next figures.

In the interest of clarity of explanation, a use case of making a phone call is described. In this case, the natural language conversation relates to executing a phone call function (e.g., based on a particular skill that provides this function) and, as such, includes inputs and outputs to determine phone call-related parameters (e.g., identity of the contact to call). Of course, the embodiments of the present disclosure are not limited as such and similarly apply to any other use cases (e.g., controlling the vehicle infotainment system, requesting driving directions to a point of interest, playing a game trivia, ordering a pizza, and the like).

The conversation starts with a first natural language utterance of a user 130, illustrated as "Computer, make a phone call" 131. Upon detecting the wakeword "Computer," the device 120 generates and sends, to the computer system 110, audio data 127 corresponding to this natural language utterance. Although the use of a wakeword is described, the embodiments of the present disclosure are not limited as such. For example, the device 120 can include or interface with an input means operable to request the phone call functionality and/or to input the user utterance without the wakeword (e.g., upon the input means being operated, the user may simply utter "make a phone call"). An example of the input means can be a button, such as a physical button 150 (e.g., a push to talk button) integrated with the vehicle's steering wheel or another component of the vehicle (possibly, the device 120) or a graphical user interface button presented on a screen of the vehicle's infotainment system. The input means can also or alternatively include a sensing system (e.g., optical sensors) that detects a gesture requesting the functionality or triggering the device 120 to detect the subsequent user utterance and/or that detects a gaze on an phone call icon presented on the screen and corresponding to the phone call functionality.

Upon speech processing of the audio data 127, the conversation management system 140 determines an intent for a phone call and that the particular skill can be invoked to execute a function that satisfies the intent. The conversation management system 140 also determines parameters that need to be collected for the execution and, based on these parameters and the particular skill, determines an interaction model (one having predefined states and/or one that is uses artificial intelligence) to use in the conversation. Based on the interaction model, the conversation management system 140 (e.g., a natural language generator thereof) generates a first TTS message that is then included and sent in instruction data 111 to the device 120. Accordingly, the device 120 outputs a first natural language response based on the first TTS message, where this response is illustrated in FIG. 1 as "Ok, who do you want to call?" 121.

Next, the device 120 detects a second natural language utterance of the user 130, illustrated as "John" 132. The device 120 generates and sends, to the computer system 110, audio data 127 corresponding to this natural language utterance. Upon speech processing of the audio data 127, the conversation management system 140 determines a token that corresponds to a parameter: a first name of a contact (e.g., John). Based on the value of this parameter, a state of the interaction model is updated such that a second TTS message is generated to request another parameter (e.g., last name). The second TTS message is then included and sent in instruction data 111 to the device 120. Accordingly, the device 120 outputs a second natural language response based on the second TTS message, where this response is illustrated in FIG. 1 as "What is John's last name?" 122.

Thereafter, the device 120 detects a third natural language utterance of the user 130, illustrated as "Hold on" 133. The device 120 generates and sends, to the computer system 110, audio data 127 corresponding to this natural language utterance. Upon speech processing of the audio data 127, the conversation management system 140 determines a keyword or an intent to pause the conversation. This determination corresponds to one example of an explicit pause trigger. As described herein below, other explicit and/or implicit pause triggers are possible, and as such, the "Hold on" 133 natural language utterance is illustrated with a dotted dialog box. For instance, the input device can be operated to request the pausing (e.g. the physical button 150 can be pushed) and/or another function of the infotainment system, the device 120, and/or the vehicle can be detected and results in the pausing (e.g., an incoming call, a request for navigation directions, the lack of a user input providing the last name, an acceleration of the vehicle, the brakes of the vehicle being applied, and the like). Based on the pause trigger, the conversation management system 140 generates data indicating the pausing. This data is included in instruction data 111 sent to the device 120, where the device 120 may output one or more indications 123 about the pausing. The one or more indications 123 can present a TTS message about the pausing (e.g. "You can get back to me") and/or a particular chime. The one or more indications 123 can also be visual by including, for instance, a graphical user interface (GUI) element 160 indicating the pausing. The GUI element 160 can be selected to resume the conversation and, as such, can be associated with multiple uses: indicating the pausing and requesting the resuming. The conversation management system 140 also stores contextual data associated with the conversation. For instance, the contextual data indicates the last requested parameter for which no value was received (e.g., the last name).

At a later point, the device 120 detects a fourth natural language utterance of the user 130, illustrated as "Let's continue" 134. This utterance need not include the wakeword because the conversation is paused. Alternatively, this utterance may only be processed if it includes the wakeword. In both situations, the device 120 generates and sends, to the computer system 110, audio data 127 corresponding to the fourth natural language utterance. Upon speech processing of the audio data 127, the conversation management system 140 determines a keyword or an intent to resume the conversation. This determination corresponds to one example of an explicit resume trigger. As described herein below, other explicit and/or implicit resume triggers are possible, and as such, the "Let's continue" 134 natural language utterance is illustrated with a dotted dialog box. For instance, the input device can be operated to request the resuming (e.g. the physical button 150 can be pushed) and/or another function of the infotainment system and/or the vehicle can be detected and results in the resuming (e.g., an end of the incoming call, completion of the navigation directions, constant speed of the vehicle, the brakes no longer applied, and the like). Additionally, or alternatively, the device 120 can include a physical resume button 170. The selection of the resume button 170 can result in the device 120 sending data to the computer system 110 indicating the request to resume. Based on the resume trigger, the conversation management system 140 retrieves the contextual data associated with the conversation. In addition, the conversation management system 140 generates a third TTS message to request again the last requested parameter (e.g., the last name). The third TTS message may, but need not (as illustrated in FIG. 1), be the same as the second TTS message. The third TTS message is then included and sent in instruction data 111 to the device 120. Accordingly, the device 120 outputs a third natural language response based on the third TTS message, where this response is illustrated in FIG. 1 as "John who?" 124.

The user 130 then replies to the third natural language response by providing a fifth natural language utterance, illustrated as "Smith" 135. Here also, the device 120 detects the fifth natural language utterance and generates and sends, to the computer system 110, corresponding audio data 127. Upon speech processing of the audio data 127, the conversation management system 140 determines a second token that correspond to the last name parameter (e.g., Smith). Of course, if other parameters need to be defined (call John Smith's office, home, or cell phone), the conversation can continue in a similar manner as described above. Additionally, the pausing and resuming can be repeated. Assuming that the needed parameters are defined, the computer system 110 can then send, via an API, the parameter values to the computing component that provides the function, thereby causing an executed function 142 based on the values. The conversation management system 140 can also generate a fourth TTS message about the executed function 142. The fourth TTS message is then included and sent in instruction data 111 to the device 120. Accordingly, the device 120 outputs a fourth natural language response based on the fourth TTS message, where this response is illustrated in FIG. 1 as "Connecting you" 125.

Figure 2:
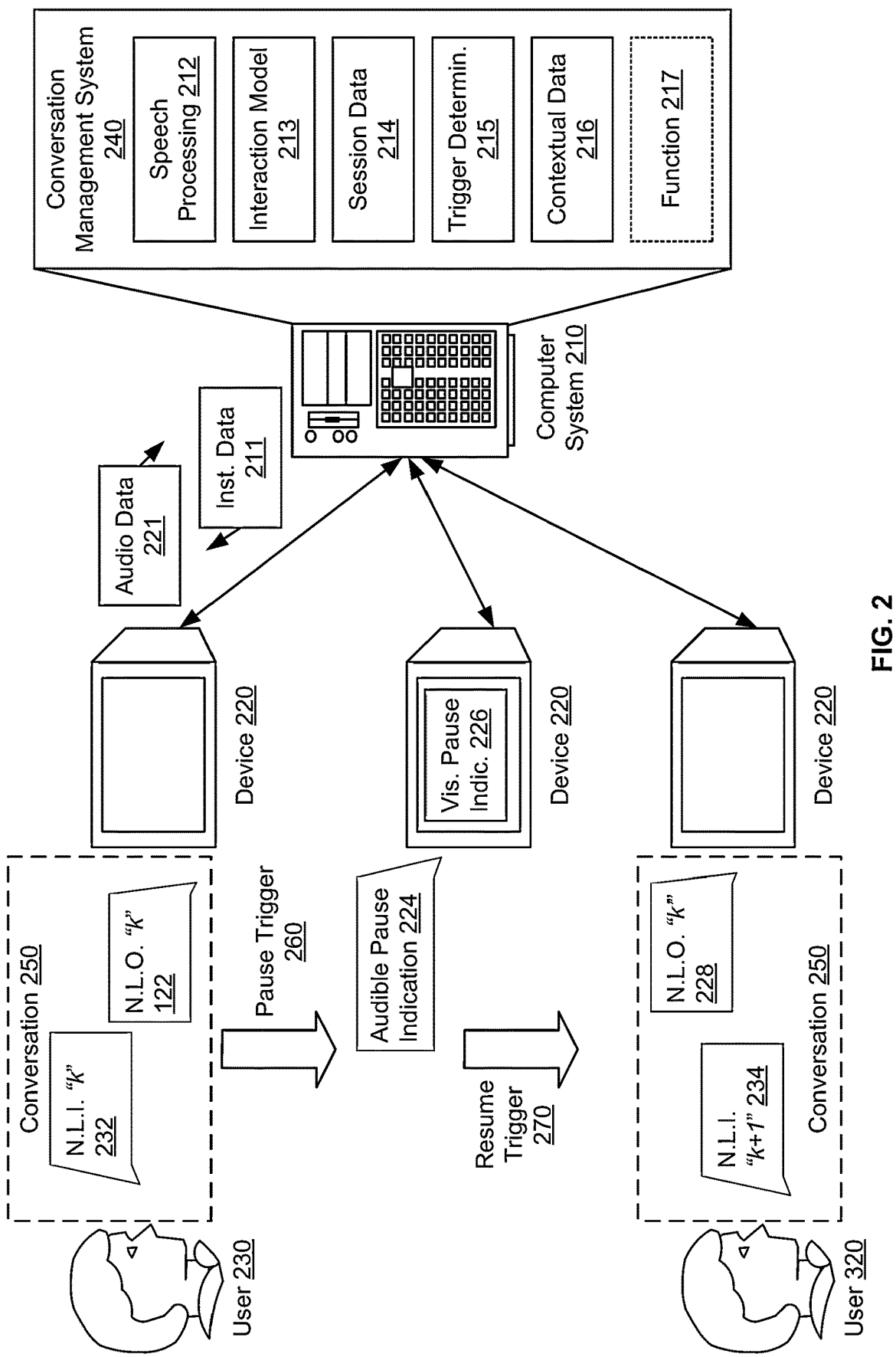
FIG. 2 illustrates an example of an environment for computer system-based pausing and resuming of natural language conversations, according to embodiments of the present disclosure.

FIG. 2 illustrates an example of an environment for computer system-based pausing and resuming of natural language conversations, according to embodiments of the present disclosure. The environment includes, among other things, a computer system 210 and a device 220 that are communicatively coupled over one or more data networks (not shown in FIG. 2). The device 220 may be accessible to a user 230, whereby natural language inputs of the user 230 can be detected by the device 220. The device 220 can generate and send, to the computer system 210, audio data 221 that corresponds to the natural language inputs (shown in the figure with the abbreviation N.L.I.). In turn, the computer system can process the audio data 221 and send instruction data 211 to the device 220 for presenting natural language outputs to the natural language inputs (shown in the figure with the abbreviation N.L.O.). In an example, the natural language inputs and the natural language outputs form a natural language conversation, shown as a conversation 250. During the conversation 250, the computer system 210 can determine a pause trigger 260 to pause the conversation 250. Upon this pause trigger 260, the computer system 210 causes the device 220 to output one or more indications about the pausing. Upon determining a resume trigger 270 to resume the conversation 250, the computer system causes the device 220 to output one or more indications about the resuming, and the conversation 250 can be resumed via the device 220.

In an example, the computer system 210 can be operated by a service provider and implemented as hardware (e.g., a set of hardware servers) or software hosted on hardware (e.g., a cloud-based service) suitable for communication with devices over one or more data networks. Generally, the computer system 210 includes one or more processors and one or more memory that store computer-readable instructions that, upon execution by the one or more processors, configure the computer system 210 to provide functionalities of a conversation management system 240, as described in the present disclosures. Computing components of the conversation management system 240 are further described herein below.

In comparison, the device 220 can be operated by the user 230 for accessing some or all of the functionalities of the conversation management system 240 and can be any suitable device that communicates with the computer system 210 over one or more data networks and that executes an application for interfacing with the conversation management system 240. The application can be a voice agent, a smart assistant, and the like. The application can be available from the service provider or from another entity (e.g., a third party). In certain situations, the device 220 can execute multiple applications: a first application available from the entity and a second application available from the service provider. In this case, the audio data 221 can be generated based on the execution of one of the two applications (e.g., the first application) and passed to the second application (e.g., via an application programming interface (API)) that in turn causes the device 220 to send the audio data 221 to the computer system 210.

Examples of the device 220 include a smart phone, a tablet, a laptop computer, a desktop computer, a smart speaker, a wearable device, a smart set top box, a smart television, a smart appliance, an Internet of Things (IoT) device, a device of a vehicle infotainment system, and the like. Generally, the device 220 can include an acoustic front end for receiving natural language inputs of the user 230 and generating audio data 221, one or more processors and one or more memory that store computer-readable instructions that, upon execution by the one or more processors, configure the device 220 to execute the application(s) and communicate with the computer system 210 in order to send the audio data 221 and receive the instruction data 211, and a user output interface that can include a speaker and/or a screen to present by the application(s) the natural language responses based on the instruction data 211.

In an example, the conversation 250 includes multiple inputs and outputs of a dialog managed, at least in part, by the conversation management system 240. The inputs and outputs can indicate at least a parameter of a function prior to an execution of the function. The conversation management system 240 can associate the inputs and outputs with the conversation 250. In an example of the association, the conversation 250 is associated with an identifier and, in turn, the inputs and the outputs are associated with that same identifier. The identifier can be a session identifier of a session that corresponds to the conversation. An input can correspond to a user input received by the device, such as a natural language utterance detected by the device 220 or natural language text determined by the device. An output correspond to a response that is generated by the computer system 210 and that is presented by the device 220 based on an input, such as a natural language response presented via a speaker and/or a screen of the device 220.

The conversation 250 can request a function to be executed. A computing component of the computer system 210 or of another computer system (e.g., of a third party) can store program code for an application (that may also be referred to as a skill) that, upon execution, provides the function as part of an application session. The computer system 210 can send a request to the computer system about the requested function. The application session starts when the request is sent and ends when the function is executed (or at least starts executing). The output of the function's execution can be provided to the device 220, another device, and/or a computer system (e.g., the computer system 210). The computer system 210 can generate a session identifier for the application session and store session data about the application session, where the session data is associated with the session identifier.

In the illustration of FIG. 2, the conversation 250 includes natural language inputs and natural language outputs prior to the pausing and after the resuming. In particular, prior to the pausing, the conversation 250 includes a natural language input "k" 232 and a natural language output "k" 222. The natural language input "k" 232 can take the form of audio data corresponding a natural language utterance received by the device 220 and/or natural language text input also received by the device 220. In both case, the natural language input "k" 232 can be the initial input in the conversation 250 in which the function is requested (e.g., "Computer, I would like to order pizza," where the function is "ordering pizza") and can include a wakeword (e.g., "Computer" in this illustrative case). Alternatively, the natural language input "k" 232 can be a subsequent input in the conversation 250 in which one or more values of one or more parameters for the execution of the function are indicated (e.g., "One medium pizza," in which the parameters are the quantity and the size of pizzas to be ordered). The natural language output "k" 222 can be presented by the device 220 as a response to the natural language input "k" 232 and can be based on a message (a text-to-speech (TTS) message for an audible output and/or text message for a visual output) included in instruction data 211 received from the computer system 210 prior to the pausing. The response can request one or more values of the one or more parameters (e.g., "What size pizza would you like?").

Upon the resuming, the device 220 can present first (e.g., prior to a next natural language input "k+1" 234 of the user 230) a natural language output "k" 228. This natural language output "k'" 228 can relate to the last natural language output "k" 222 that was presented by the device 220 prior to the pausing and can be based on a TTS message included in instruction data 211 received from the computer system 210 to resume the conversation 250. This relationship is indicated in the figure by using the apostrophe following the letter "k". For instance, the natural language output "k'" 228 can be the same as the last natural language output "k" 222 (e.g., by presenting the same reply of "What size pizza would you like?") or can be different but still relate to the same parameter(s) of the last natural language output "k" 222 (e.g., by requesting an input to the parameter(s) in a different way, such as "Please remind if you prefer medium or large pizza"). Thereafter, the next natural language input "k+1" 234 is received by the device 220, resulting in audio data 221 being sent to the computer system 210. Although FIG. 2 illustrates a conversation 250 that includes two natural language inputs and two natural language outputs, the conversation 250 can include a different (e.g., a larger) number of natural language inputs and/or natural language outputs. Furthermore, although FIG. 2 illustrates a conversation 250 that is being paused and resumed once, the conversation 250 can be similarly paused and resumed multiple times.

In an example, the pause trigger 260 can be explicit. For instance, the pause trigger 260 corresponds to audio data 221 generated by the device 220 and representing a natural language input requesting the conversation 250 to be paused (e.g., "Hold on"). In this case, the audio data 221 can include a predefined keyword that indicates the explicit trigger (e.g., the keyword can be from a predefined set of "Hold on," "Pause," "Stop for now" and the like). Alternatively, no keyword may be predefined. Instead, speech processing is applied to the audio data 221 to determine the intent for pausing the conversation 250. In another illustration, an input means interfacing or integrated with the device 220 can be operated to request the resuming, and the device 220 can send data (e.g., text data) indicating this resuming to the computer system 210. The input means can be a physical button, such as the physical button 150 installed in a steering wheel and interfacing with the device 120, or such as the physical button 170 integrated with the device 120. The input means can also or alternatively include a sensing system (e.g., optical sensors) that detects a gesture requesting the pausing and/or a gaze of the user 230 on an GUI icon of an application that is unassociated with the requested function.

Additionally, or alternatively, the pause trigger 260 can be implicit. For instance, the pause trigger 260 corresponds to audio data 221 generated by the device 220 and representing a natural language input indicating a different intent and/or function than that of the conversation 250 (e.g., "Computer, I need directions to the nearest gas station" in the case of the device 220 being in a vehicle or being a part of the vehicle's infotainment system). In another illustration, the pause trigger 260 corresponds to data from another application indicating that the user's 230 attention likely changed. In this illustration, and as explained above, a first application can be executing on the device 220 as a voice agent or other type of a smart assistant that at least outputs the natural language responses. A second application can also be executing on the device 220 (e.g., a call application that supports phone calls). Based on the execution of a function by the second application, the data (e.g., indicating an incoming call in the example of the call application) can be sent from the second application to the first application via an API or can be received by the first application from an operating system. In yet another illustration, the device 220 can be configured with sensors (e.g., optical sensors that are used for gaze detection), where sensor data output by such sensors can indicate that the user's 230 attention likely changed (e.g., gaze detection data indicating that the user's gaze shifted on a screen from a GUI icon of the first application to a GUI icon of the second application).

In another illustration of an implicit pause trigger, the pause trigger 260 can involve a predefined time period (e.g., eight seconds, or some other time period). A timer can be started by the device 220 after a natural language output is presented by the device 220. If no natural language input is detected by the time when the timer's value exceeds the predefined time period, the device 220 can send an indication about the lack of natural language input to the computer system 210. Alternatively, upon sending instruction data to the device 220 for presenting the natural language output, the computer system 210 can start a timer. Here, if no audio data is received from the device 220 by the time when the timer's value exceeds the predefined time period, the computer system 210 can determine the lack of natural language input. In both cases, the lack of natural language input within the predefined time period can be treated as an implicit pause trigger. Further, in certain situations, the lack of natural language input can be coupled with the progress of the conversation 250. The pause trigger 260 is determined when the progress is far enough and, otherwise, no trigger is detected upon the detection of the lack of natural language input within the predefined time period. Different techniques can be implemented to determine the progress. In one example technique, the progress corresponds to the number of natural language outputs (e.g., "k") already presented during the conversation 250. If this number exceeds a threshold number (e.g., five), the implicit pause trigger is determined. In another example technique, the progress corresponds a ratio of this number over an expected number of natural language outputs needed to collect all parameter values during the conversation 250. If the ratio exceeds a threshold ratio (e.g., 0.5 or fifty percent), the implicit pause trigger is determined. In yet another example technique, the progress corresponds to the number of parameter values already determined during the conversation 250. If this number exceeds a threshold number (e.g., five), the implicit pause trigger is determined. In a further example technique, the progress corresponds a ratio of this number over a total number of parameter values that are to be collected during the conversation 250. If the ratio exceeds a threshold ratio (e.g., 0.5 or fifty percent), the implicit pause trigger is determined.

Upon detecting the pause trigger 260, the computer system 210 can send instruction data 211 to the device to present one or more indications about the pausing. In an example, the one or more indications include an audible pause indication 224. The audible pause indication 224 can be presented by a speaker of the device 220 and can be based on a TTS message included in the instruction data 211. The audible pause indication 224 can be presented as a natural language indication of the pausing (e.g., "You can get back to me," "We will continue our conversation in a little bit"," and the like). The audible pause indication 224 can be transient and its presentation can stop after it is presented once. Alternatively, the audible pause indication 224 can be more persistent and its presentation can be repeated multiple times according to a repetition time interval (e.g., every thirty seconds or some other time interval).

In an additional or alternative example, the one or more indications include a visual pause indication 226. The visual pause indication 226 can depend on the output modality capability of the device 220. When the device 220 includes or is coupled with a screen, the visual pause indication 226 can be presented on the screen and can include a GUI component. In this case, the GUI component can indicate the function (or the skill) that is on pause and can be selectable to resume the conversation 250. When the device 220 includes or is coupled with a set of light sources (e.g., a light ring or bar that includes light emitting diodes (LEDs)), the visual pause indication 226 can be presented by using the light sources. For instance, the light sources emit light using a particular pattern (e.g., flashing pattern at a particular ON/OFF rate) to indicate the pausing and at a particular wavelength (e.g., a blue color) to indicate the function (or the skill) that is on pause. Generally, the visual pause indication 226 can persist until the conversation 250 is resumed or can be dismissed (e.g., no longer presented on the screen and/or the light sources) after some predefined time interval even when the conversation 250 is not resumed (e.g., after thirty minutes of the pausing start or some other time interval).

Although FIG. 2 illustrates the use of an audible pause indication 224 and/or visual pause indication 226, the pausing may not be explicitly indicated by the device 220. Instead, an option to resume the conversation (e.g., such as a GUI component selectable to trigger the resuming) can be presented. In this case, the presentation of the resume option can be an implicit presentation of a pause indicator.

In an example, the resume trigger 270 can be explicit. For instance, the resume trigger 270 corresponds to audio data 221 generated by the device 220 and representing a natural language input requesting the conversation 250 to be resumed (e.g., "Resume"). In this case, the audio data 221 can include a predefined keyword that indicates the explicit trigger (e.g., the keyword can be from a predefined set of "Resume," "Continue," and the like). Alternatively, no keyword may be predefined. Instead, speech processing is applied to the audio data 221 to determine the intent for resuming the conversation 250. In another illustration, the input means can be operated to explicitly request the resuming.

Additionally or alternatively, the resume trigger 270 can be implicit. For instance, the resume trigger 270 corresponds to data from another application indicating that the user's 230 attention likely changed back to the paused conversation. In this illustration, and as explained above, a first application can be executing on the device 220 as a voice agent or other type of a smart assistant that at least outputs the natural language responses. A second application can also be executing on the device 220 (e.g., a call application that supports phone calls). Based on the termination of the execution of a function by the second application, the data (e.g., indicating that a phone call has ended in the example of the call application) can be sent from the second application to the first application via an API or can be received by the first application from an operating system. In another illustration, the device 220 can be configured with sensors (e.g., optical sensors that are used for gaze detection), where sensor data output by such sensors can indicate that the user's 230 attention likely reverted back (e.g., gaze detection data indicating that the user's gaze shifted on the screen to back on the GUI icon of the first application, or to be gazing on the GUI component that indicates the pausing).

Turning now to the conversation management system 240, its computing components provide speech processing 212, an interaction model 213, session data 214, trigger determination 215, contextual data 216, and, optionally as indicated with the dotted rectangle, a function 217. As described herein above, the function 217 may be provided by a skill (or application) having program code stored on the computer system 210 of the service provider or on a computer system of another entity. In an example, the computer system 210 performs the speech processing 213 on audio data 221 received from the device 220. The output of the speech processing 217 can indicate the function 217 that is requested. The interaction model 213 is associated with the function 217 (or the skill that provides the function) and can drive the interactions of the dialog that represents the conversation 250. The session data 214 is associated with the application session (or skill session) and includes, among other things, a state of the application session (e.g., ongoing, paused, resumed, terminated, and the like) and a state of the function 217 (e.g., inactive, backgrounded, active, foregrounded, and the like). The trigger determination 215 can include data (e.g., a flag) indicating the detection of the trigger pause 260 and/or the trigger resume 270. The contextual data 216 can include data indicating a context of the conversation 250 prior to the pausing and a state of the interaction model 213.

The speech processing 212 can include an automatic speech recognition (ASR) and natural language understanding (NLU) process. This process outputs an intent (e.g., the execution of the function 217). The speech processing also includes performing an entity resolution process to identify tokens (e.g., the values of the parameters to be used in the execution of the function 217). ASR and NLU, used in combination, are an example of the speech processing 212. ASR on its own can also be an example of the speech processing 212. NLU on its own can also be an example of the speech processing 212. The speech processing 212 can additionally or alternatively use other speech processing techniques, such ones involving audio-to-intent/meaning representation (e.g., end-to-end models that effectively perform the functionalities of both ASR and NLU in one step/model/component rather than having two separate steps for creating the transcription and then defining the meaning of the transcription).

Although FIG. 2 illustrates that the speech processing 212 is performed on audio data received from the device 220, the embodiments of the present disclosure are not limited as such. For example, ASR can be performed by an application executing on the device 220 and text data can be received by the computer system instead of audio data. In this example, NLU (or other type of speech processing) can be performed on the text data as part of the speech processing 212. In another illustration, ASR need not be performed. For instance, the text data is directly received as natural language input in a chat window of a text-based application executing on the device 220 (e.g., a text chat bot).

Based on the output of the speech processing 212, the interaction model 213 can generate data about a next set of parameters for which the values are to be defined. A natural language generation (NLG) of the conversation management system 240 can use this data to generate output data that is then included in the instruction data sent to the device 220. The output data can take the form of a synthesized speech audio data and/or a TTS message that is presented by the device 220 (e.g., as an audible natural language response via a speaker and/or a natural language text output on a screen via, for instance, a chat bot). In an example, the interaction model 213 can have a predefined set of states that define dialog paths that can drive the conversation 250 to request the values of the parameters for the execution of the function 217. In this example, upon an output of the speech processing 212 indicating a request for the execution of the function 217, the set of states can be retrieved and an initial state (e.g., a starting point) can be used to generate the initial response (e.g., the initial natural language output). Subsequently, upon an output of the speech processing 212 indicating a requested value or an updated to a previously requested value, another state of the set of states is determined and can be used to generate the next response (e.g., the next natural language output).

In another example, rather than using a predefined set of states, an artificial intelligence (AI) model can be used as an implementation of the interaction model 213. This AI-driven approach to dialog management supports skills that users can interact with in a natural, less constrained way by using the phrases they prefer, in the order they prefer. The AI-driven approach can use deep learning to extrapolate the dialog paths that customers might successfully follow through a vast range of possible conversations. The interaction model 213 can include multiple instances of an AI model, each trained for a specific skill (or application) based on a set of states and conversation paths. Based on the output of the speech processing 212 indicating the function 217, the set of parameters needed for the execution of the function 217 and the AI model corresponding to the skill (or application) that provides the function 217 are identified. The interaction model 213 can then track contexts, inputs, and states in real-time to automatically generate the output data in order to collect the values of the parameters. Upon the values being collected, the interaction model 213 can send these values to the skill (or application) via, for instance, an API call.

The session data 214 can be associated with the skill session (or application session). Upon an output of the speech processing 212 indicating the function 217, the computer system 210 can send a request for the skill (or application) to a computing component that stores the relevant program code. The request contains a session object that uses a Boolean value indicating a new session. The computing component can send a response indicating that the session is to remain open (e.g., such that any detected natural language input following the initial input using a wakeword ("Computer" or any other wakeword) can be processed without the need for the wakeword to be repeated). The session data 214 is updated to indicate that the session is ongoing (e.g., open, active, and the like) and that skill and/or the function 217 is not executing yet (e.g., skill in the foreground, function 217 not executing). Upon the detection of the pause trigger 260 (as indicated by the trigger determination 215), the session data 214 can be modified to indicate one or more updated states of the session and/or the skill (or the application). An updated state of the session can indicate that the session is paused. An updated state of the skill can indicate that the skill is in inactive or in the background. Any or both of these updated states can be used to stop, for the purpose of executing the function 217, the processing of subsequently detected natural language inputs that do not include the wakeword. Upon the detection of the resume trigger 270 (as indicated by the trigger determination 215), the session data 214 can be modified to indicate one or more updated states of the session and/or the skill (or the application). An updated state of the session can indicate that the session is resumed. An updated state of the skill can indicate that the skill is in active or in the foreground. Any or both of these updated states can be used to resume, for the purpose of executing the function 217, the processing of subsequently detected natural language inputs that do not include the wakeword.

The contextual data 216 can indicate a state of the interaction model 213 at the time the pause trigger is detected (e.g., either the last state from the predefined states or the last state used by the AI model). The contextual data 216 can also indicate the one or more parameters that were requested in the last natural language output presented by the device 220 and for which no corresponding value(s) was (were) received or for which only a partial value was received (e.g. the function 217 can be for placing a phone call, and only the area code of the phone call to be placed were determined based on a natural language input before the pausing; in this case, the area code is stored such that, upon the resuming, the remaining portion of the phone number to be used can be requested). Additionally, the contextual data 216 can indicate the function 217, the intent, and any resolved tokens (e.g., collected values of parameters). Optionally, the contextual data 216 can also include the last output data generated and sent to the device 220.

Although FIG. 2 illustrates that the pausing and resuming are facilitated in connection with a same device 220 and a same user 230, the embodiments of the present disclosure are not limited as such. Instead, the embodiments similarly apply to the pausing via one device and the resuming via another device and/or to one user triggering the pausing and another user triggering the resuming via the same device and/or different devices as further described in the next figures.

Furthermore, although FIG. 2 illustrates that the components of the conversation management system 240 are implemented by the computer system 210, the embodiments of the present disclosure are not limited as such. For example, some of the components (e.g., the speech processing 112 component) can be implemented by the device 220. Additionally or alternatively, all of the components of the conversation management system 240 (including, optionally, the computing component providing the function 217) can be implemented by the device 220 (in which case, no data connection to the computer system 210 may be needed and the various functionalities described herein are performed locally on the device 220).

Figure 3:
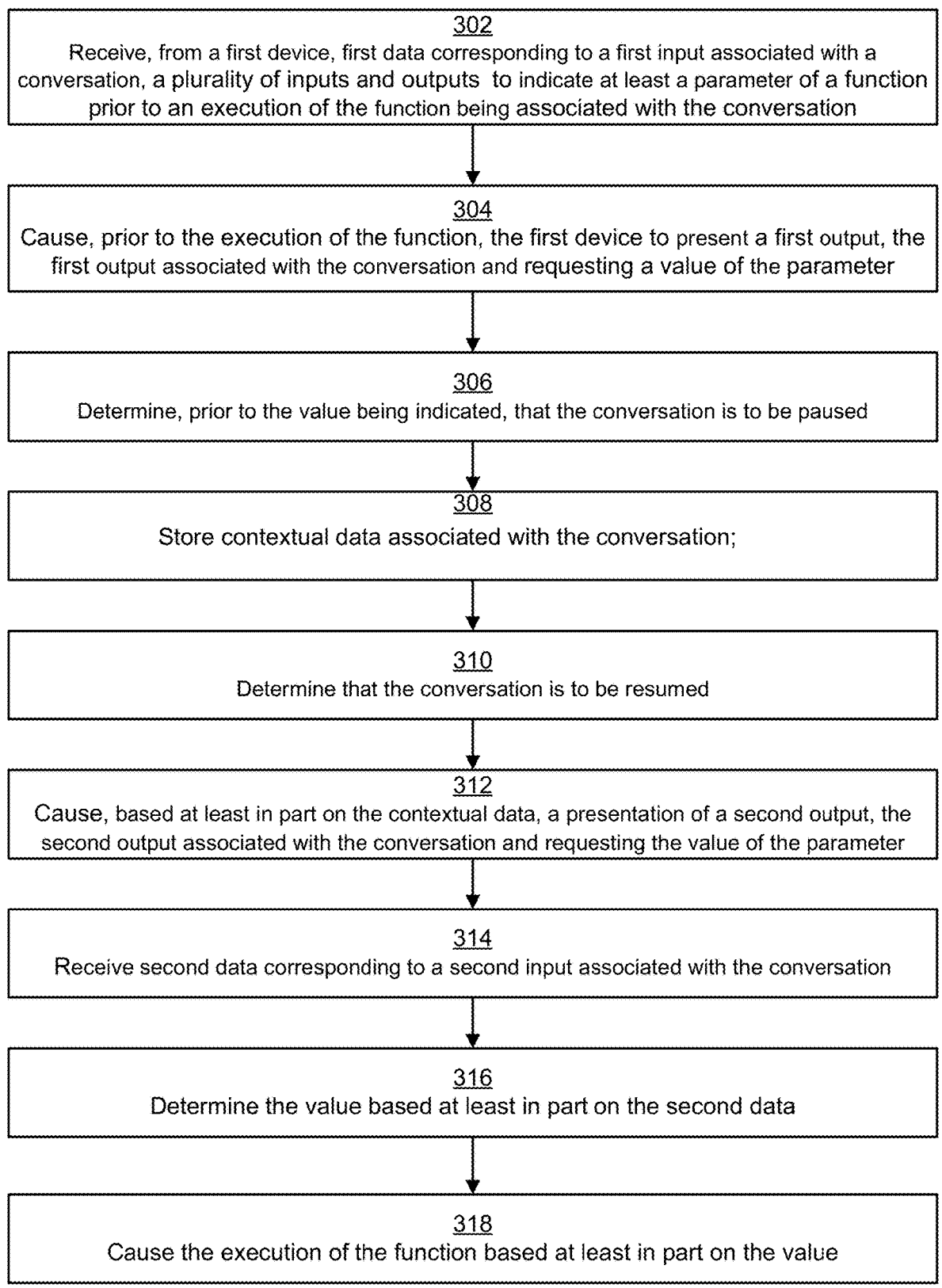
FIG. 3 illustrates an example of a flow for computer system-based pausing and resuming of natural language conversations, according to embodiments of the present disclosure.

FIG. 3 illustrates an example of a flow for computer system-based pausing and resuming of natural language conversations, according to embodiments of the present disclosure. Operations of the flow can be performed by a computer system, such as the computer system 210 of FIG. 2. Some or all of the instructions for performing the operations can be implemented as hardware circuitry and/or stored as computer-readable instructions on a non-transitory computer-readable medium of the computer system. As implemented, the instructions represent components that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow may start at operation 302, where the computer system receives, from a first device, first data corresponding to a first input associated with a conversation. A plurality of inputs and outputs to indicate at least a parameter of a function prior to an execution of the function are associated with the conversation. For instance, the first data includes audio data that represents a natural language utterance or text data that represents natural language text. The function can be available from a computing component that stores program code of a skill (or application) that provides the function.

In an example, the flow may also include operation 304, where the computer system causes, prior to the execution of the function, the first device to present a first output. The first output is associated with the conversation and requests a value of the parameter. For instance, upon natural language processing of the first data and a determination of intent and/or token, and upon a state of an interaction model, the computer system generates a TTS message that requests a parameter value for the execution of the function. The TTS message is sent in instruction data to the device that, in turn, outputs the TTS message as a natural language response via a speaker or a screen.

In an example, the flow may also include operation 306, where the computer system determines, prior to the value being indicated, that the conversation is to be paused. As explained herein above, different types of pause triggers are possible including any or a combination of an explicit trigger (e.g., audio data indicating a natural language utterance requesting the pausing, and the like) or an implicit trigger (e.g., change to the intent and/or conversation topic, user's attention shifting to another application, lack of natural language utterance within a predefined time period from the output of the first response, and the like). Upon determining the pause trigger, the computer system can update session data of a session associated with the conversation (e.g., a skill session or an application session) to indicate that the session is paused and that the skill (or application) is backgrounded.

In an example, the flow may also include operation 308, where the computer system stores contextual data associated with the conversation. For instance, the contextual data indicates, among other things, the last state of the interaction model, the parameter that was last requested in the TTS message, the intent, the conversation topic, the skill (or application), the requested function, the TTS message, and the like. The contextual data can be associated with the session identifier.

In an example, the flow may also include operation 310, where the computer system determines that the conversation is to be resumed. As explained herein above, different types of resume triggers are possible including any or a combination of an explicit trigger (e.g., audio data indicating a natural language utterance requesting the resuming, user selection of the GUI component, a user selection of a physical button to resume, and the like) or an implicit trigger (e.g., user's attention shifting back to the conversation, and the like). Upon determining the resume trigger, the computer system can update the session data to indicate that the session is resumed and that the skill (or application) is foregrounded. The computer system can also retrieve the contextual data for use in generating instruction data.

In an example, the flow may also include operation 312, where the computer system causes, based at least in part on the contextual data, a presentation of a second output The second output is associated with the conversation and requests the value of the parameter. For instance, the computer system send instruction data to a second device to present the second output. The second device can be at least one of the first device or a different device. If different, the two devices are associated with the same account. The instruction data can include a message (e.g., a TTS message or a text message) that the device outputs as the natural language response. The content of the message can be populated with at least a portion of the contextual data. For instance, this message can be the same as the message stored in the contextual data. Alternatively, based on the stored state of the interaction model and the last requested parameter, another message is generated that also requests the value of this parameter. If the GUI component was presented, the instruction data can also indicate that its presentation is to end.

In an example, the flow may also include operation 314, where the computer system receives, from the second device, second data corresponding to a second input associated with the conversation. This second data can correspond to a resumption of the user interaction. For instance, the second data includes audio data that represents a natural language utterance or text data that represents natural language text. In both cases, the second data may indicate the requested parameter value.

In an example, the flow may also include operation 316, where the computer system the value based at least in part on the second data. For instance, upon natural language processing of the second data, the value is determined.

In an example, the flow may also include operation 318, where the computer system causes the execution of the function based at least in part on the second data. For instance, upon speech processing of the second data, a token is determined and corresponds to the requested value. This value and/or other collected values can be sent to the computing component (e.g., via an API) to execute the function. The computing component can respond with a request to end the session. Accordingly, the computer system can update the session data to indicate that the session has ended.

Herein above, FIG. 3 illustrates two inputs and two outputs associated with the conversation. However, the flow equivalently applies to a different number of inputs and a different number of outputs. Further, FIG. 3 illustrates a single pausing/resuming. The flow also equivalently applies to multiple instances of pausing/resuming.

In the next figures, the processing natural language utterances and natural language responses thereto are described for illustrative purposes. As explained herein above, the embodiments are not limited as such. Instead, the embodiments equally apply to any other type of input (including natural language utterances and natural language text) and any other type of output (including natural language responses via a speaker or a screen).

Figure 4:
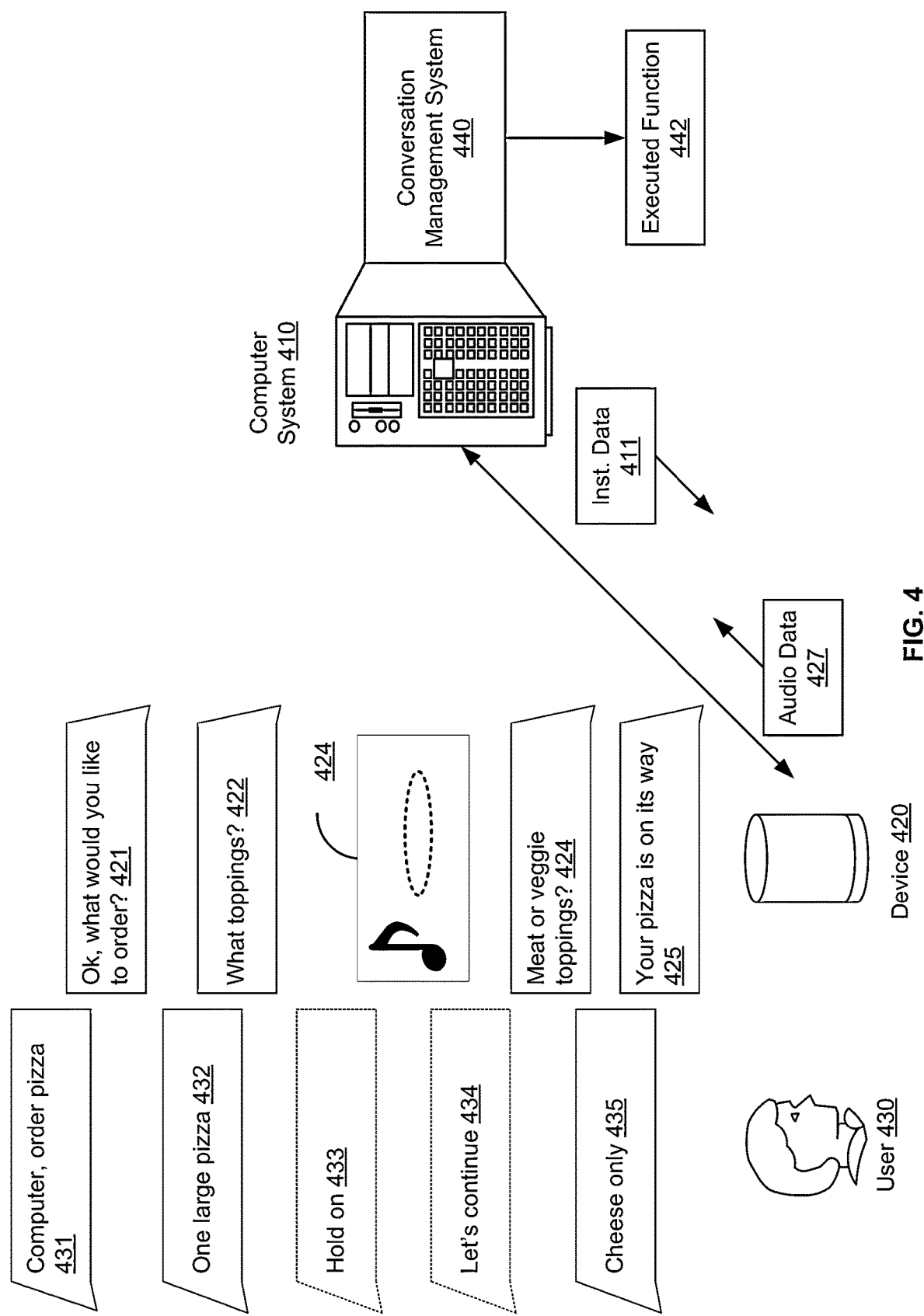
FIG. 4 illustrates an example of using a user interface of a device for pausing and resuming of natural language conversations, according to embodiments of the present disclosure.

FIG. 4 illustrates an example of using a user interface of a device 420 for pausing and resuming of natural language conversations, according to embodiments of the present disclosure. In the illustration, the user interface supports a vocal input modality and an audio output modality. The vocal input modality is used to pause and resume a natural language conversation. The audio output modality is used to indicate that the natural language conversation is paused. In addition, the device 420 can include a set of light sources as a visual output modality. The visual output modality can also be used to indicate that the natural language conversation is paused. The device 420 can be communicatively coupled with a computer system 410 that provides a conversation management system 440. The device 420, the computer system 410, and the conversation management system 440 are examples of the device 220, the computer system 210, and the conversation management system 240, respectively, of FIG. 2.

In the interest of clarity of explanation, a use case of ordering pizza is described. In this case, the natural language conversation relates to executing a pizza ordering function (e.g., based on a particular skill that provides this function) and, as such, includes interactions to determine pizza-related parameters (e.g., quantity, size, toppings, and the like). Of course, the embodiments of the present disclosure are not limited as such and similarly apply to any other use cases (e.g., making a phone call, requesting driving directions to a point of interest, and the like).

The conversation starts with a first natural language utterance of a user 430, illustrated as "Computer, order pizza" 431. Upon detecting the wakeword "Computer," the device 420 generates and sends, to the computer system 410, audio data 427 corresponding to this natural language utterance. Upon speech processing of the audio data 427, the conversation management system 440 determines an intent for ordering pizza and that the particular skill can be invoked to execute a function that satisfies the intent. The conversation management system 440 also determines parameters that need to be collected for the execution and, based on these parameters and the particular skill, determines an interaction model (one having predefined states and/or one that is AI-driven) to use in the conversation. Based on the interaction model, the conversation management system 440 generates a first TTS message that is then included and sent in instruction data 411 to the device 420. Accordingly, the device 420 outputs a first natural language response based on the first TTS message, where this response is illustrated in FIG. 4 as "Ok, what would you like to order?" 421. The conversation management system 440 also generates session data indicating that a skill session is ongoing, such that additional audio data can be processed without the need for the wakeword to be repeated.

Next, the device 420 detects a second natural language utterance of the user 430, illustrated as "One large pizza" 432. The device 420 generates and sends, to the computer system 410, audio data 427 corresponding to this natural language utterance. Upon speech processing of the audio data 427, the conversation management system 440 determines two tokens that correspond to two parameters: the amount of pizzas to order (e.g., one) and the pizza size (e.g., large). Based on the values of these two parameters, a state of the interaction model is updated such that a second TTS message is generated to request another parameter (e.g., toppings). The second TTS message is then included and sent in instruction data 411 to the device 420. Accordingly, the device 420 outputs a second natural language response based on the second TTS message, where this response is illustrated in FIG. 4 as "What toppings?" 422.

Thereafter, the device 420 detects a third natural language utterance of the user 430, illustrated as "Hold on" 433. The device 420 generates and sends, to the computer system 410, audio data 427 corresponding to this natural language utterance. Upon speech processing of the audio data 427, the conversation management system 440 determines a keyword or an intent to pause the conversation. This determination corresponds to one example of an explicit pause trigger. As described herein above, other explicit and/or implicit pause triggers are possible, and as such, the "Hold on" 433 natural language utterance is illustrated with a dotted dialog box. Based on this determination, the conversation management system 440 updates the session data to indicate that the session is paused and that the particular skill is backgrounded and stores contextual data associated with the session (e.g., the contextual data indicating the particular skill, the last requested parameter, and the like). In addition, the conversation management system 440 generates data indicating the pausing. This data is included in instruction data 411 sent to the device 420, where the device 420 outputs one or more indications 423 about the pausing. The one or more indications 423 can present a TTS message about the pausing (e.g. "You can get back to me") and/or a particular chime. The one or more indications 423 can be visual, where the light sources use a particular flashing pattern and light color to indicate the pausing and the particular skill.

At a later point, the device 420 detects a fourth natural language utterance of the user 430, illustrated as "Let's continue" 434. This utterance need not include the wakeword because the state of the session is paused rather than terminated. Alternatively, this utterance may only be processed if it includes the wakeword. In both situations, the device 420 generates and sends, to the computer system 410, audio data 427 corresponding to the fourth natural language utterance. Upon speech processing of the audio data 427, the conversation management system 440 determines a keyword or an intent to resume the conversation. This determination corresponds to one example of an explicit resume trigger. As described herein above, other explicit and/or implicit resume triggers are possible, and as such, the "Let's continue" 434 natural language utterance is illustrated with a dotted dialog box. Based on this determination, the conversation management system 440 updates the session data to indicate that the session is resumed and that the particular skill is foregrounded and retrieves the contextual data associated with the session. In addition, the conversation management system 440 generates a third TTS message to request again the last requested parameter (e.g., toppings). The third TTS message may, but need not (as illustrated in FIG. 4), be the same as the second TTS message. The third TTS message is then included and sent in instruction data 411 to the device 420. Accordingly, the device 420 outputs a third natural language response based on the third TTS message, where this response is illustrated in FIG. 4 as "Meat or veggie toppings?" 424.

The user 430 then replies to the third natural language response by providing a fifth natural language utterance, illustrated as "Cheese only" 435. Here also, the device 420 detects the fifth natural language utterance and generates and sends, to the computer system 410, corresponding audio data 427. Upon speech processing of the audio data 427, the conversation management system 440 determines a third token that correspond to a third parameter: the toppings (e.g., cheese). Of course, if other parameters need to be defined, the conversation can continue in a similar manner as described above. Additionally, the pausing and resuming can be repeated. Assuming that only the three parameters (quantity, size, and toppings) are needed to execute the function, the state of the interaction model is updated to indicate an end state corresponding to having all needed parameter values. The computer system 410 can then send, via an API, the parameter values to the computing component that provides the function, thereby causing an executed function 442 based on the values. The conversation management system 440 can also update the session data to indicate that the session has ended and can generate a fourth TTS message about the executed function 442. The fourth TTS message is then included and sent in instruction data 411 to the device 420. Accordingly, the device 420 outputs a fourth natural language response based on the fourth TTS message, where this response is illustrated in FIG. 4 as "Your pizza is on its way" 425.

Figure 5:
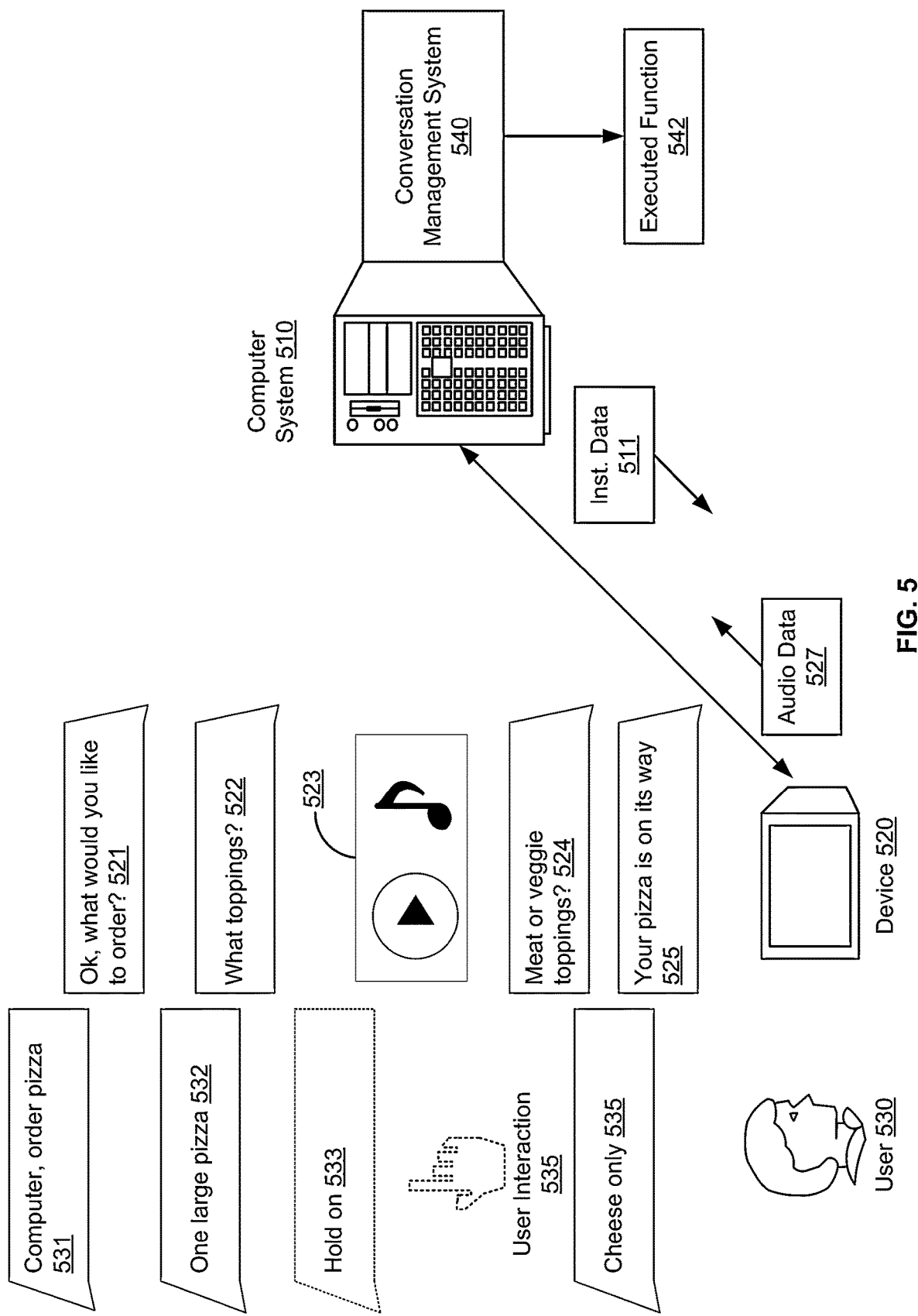
FIG. 5 illustrates an example of using multiple user interfaces of a device for pausing and resuming of natural language conversations, according to embodiments of the present disclosure.

FIG. 5 illustrates an example of using multiple user interfaces of a device 520 for pausing and resuming of natural language conversations, according to embodiments of the present disclosure. In the illustration, a first user interface supports a vocal input modality and an audio output modality. The vocal input modality is used to pause a natural language conversation. The audio output modality can be used to indicate that the natural language conversation is paused. A second user interface supports a touch input modality and a graphical output modality. The graphical output modality is used to indicate that the natural language conversation is paused. The touch input modality is used to resume natural language conversation. Although not illustrated in FIG. 5, the device 520 can include a set of light sources as a visual output modality. The visual output modality can also be used to indicate that the natural language conversation is paused. The device 520 can be communicatively coupled with a computer system 510 that provides a conversation management system 540. The device 520, the computer system 510, and the conversation management system 540 are examples of the device 220, the computer system 210, and the conversation management system 240, respectively, of FIG. 2.

In the interest of clarity of explanation, the use case of ordering pizza is also described herein. Of course, the embodiments of the present disclosure are not limited as such and similarly apply to any other use cases (e.g., making a phone call, requesting driving directions to a point of interest, and the like). In addition, rather than detecting natural language utterances via the vocal input modality, natural language input can be received via the touch input modality (e.g., in a conversation window with a chat bot). Additionally or alternatively, rather than presenting natural language responses via the audio output modality, such responses can be presented via the graphical output modality (e.g., in the conversation window). In such situations, the speech processing can be adjusted (e.g., ASR need not be performed and TTS messages need not be used in the conversation management system 540).

The conversation starts with a first natural language utterance of a user 530, illustrated as "Computer, order pizza" 531. Upon detecting the wakeword "Computer," the device 520 generates and sends, to the computer system 510, audio data 527 corresponding to this natural language utterance. Upon speech processing of the audio data 527, the conversation management system 540 determines an intent for ordering pizza and that the particular skill can be invoked to execute a function that satisfies the intent. The conversation management system 540 also determines parameters that need to be collected for the execution and, based on these parameters and the particular skill, determines an interaction model (one having predefined states and/or one that is AI-driven) to use in the conversation. Based on the interaction model, the conversation management system 540 generates a first TTS message that is then included and sent in instruction data 511 to the device 520. Accordingly, the device 520 outputs a first natural language response based on the first TTS message, where this response is illustrated in FIG. 5 as "Ok, what would you like to order?" 521. The conversation management system 540 also generates session data indicating that a skill session is ongoing, such that additional audio data can be processed without the need for the wakeword to be repeated.

Next, the device 520 detects a second natural language utterance of the user 530, illustrated as "One large pizza" 532. The device 520 generates and sends, to the computer system 510, audio data 527 corresponding to this natural language utterance. Upon speech processing of the audio data 527, the conversation management system 540 determines two tokens that correspond to two parameters: the amount of pizzas to order (e.g., one) and the pizza size (e.g., large). Based on the values of these two parameters, a state of the interaction model is updated such that a second TTS message is generated to request another parameter (e.g., toppings). The second TTS message is then included and sent in instruction data 511 to the device 520. Accordingly, the device 520 outputs a second natural language response based on the second TTS message, where this response is illustrated in FIG. 5 as "What toppings?" 522.

Thereafter, the device 520 detects a third natural language utterance of the user 530, illustrated as "Hold on" 533. The device 520 generates and sends, to the computer system 510, audio data 527 corresponding to this natural language utterance. Upon speech processing of the audio data 527, the conversation management system 540 determines a keyword or an intent to pause the conversation. This determination corresponds to one example of an explicit pause trigger. As described herein above, other explicit and/or implicit pause triggers are possible and, as such, the "Hold on" 533 natural language utterance is illustrated with a dotted dialog box. Based on this determination, the conversation management system 540 updates the session data to indicate that the session is paused and that the particular skill is backgrounded and stores contextual data associated with the session (e.g., the contextual data indicating the particular skill, the last requested parameter, and the like). In addition, the conversation management system 540 generates data indicating the pausing. This data is included in instruction data 511 sent to the device 520, where the device 520 outputs one or more indications 523 about the pausing. The one or more indications 523 can present a TTS message about the pausing (e.g. "You can get back to me") and/or a particular chime. The one or more indications 523 can also include a GUI component that indicates the pausing and the paused function and/or skill (e.g., by including text such as "Incomplete conversation—pizza," "Pizza ordering incomplete," "Click here to resume ordering pizza," or the like). Content of the GUI component can be populated with a portion of the contextual data.

At a later point, the device 520 detects a user interaction 534 with the GUI component. For instance, the user interaction 534 is a selection (e.g., a tap, a double tap, a swipe, or some other gesture at the location at which the GUI component is presented). The device 520 generates and sends, to the computer system 510, data corresponding to the user interaction 534 (e.g., text data identifying the GUI component and indicating a selection thereof). Based on this data, the conversation management system 540 determines that the conversation is to be resumed. This determination corresponds to one example of an explicit resume trigger. As described herein above, other explicit and/or implicit resume triggers are possible and, as such, the user interaction 534 is illustrated with a dotted shape. Based on this determination, the conversation management system 540 updates the session data to indicate that the session is resumed and that the particular skill is foregrounded and retrieves the contextual data associated with the session. In addition, the conversation management system 540 generates a third TTS message to request again the last requested parameter (e.g., toppings). The third TTS message may, but need not (as illustrated in FIG. 5), be the same as the second TTS message. The third TTS message is then included and sent in instruction data 511 to the device 520. Accordingly, the device 520 outputs a third natural language response based on the third TTS message, where this response is illustrated in FIG. 5 as "Meat or veggie toppings?" 524.

The user 530 then replies to the third natural language response by providing a fourth natural language utterance, illustrated as "Cheese only" 535. Here also, the device 520 detects the fourth natural language utterance and generates and sends, to the computer system 510, corresponding audio data 527. Upon speech processing of the audio data 527, the conversation management system 540 determines a third token that correspond to a third parameter: the toppings (e.g., cheese). Of course, if other parameters need to be defined, the conversation can continue in a similar manner as described above. Additionally, the pausing and resuming can be repeated. Assuming that only the three parameters (quantity, size, and toppings) are needed to execute the function, the state of the interaction model is updated to indicate an end state corresponding to having all needed parameter values. The computer system 510 can then send, via an API, the parameter values to the computing component that provides the function, thereby causing an executed function 542 based on the values. The conversation management system 540 can also update the session data to indicate that the session has ended and can generate a fourth TTS message about the executed function 542. The fourth TTS message is then included and sent in instruction data 511 to the device 520. Accordingly, the device 520 outputs a fourth natural language response based on the fourth TTS message, where this response is illustrated in FIG. 5 as "Your pizza is on its way" 525.

Figure 6:
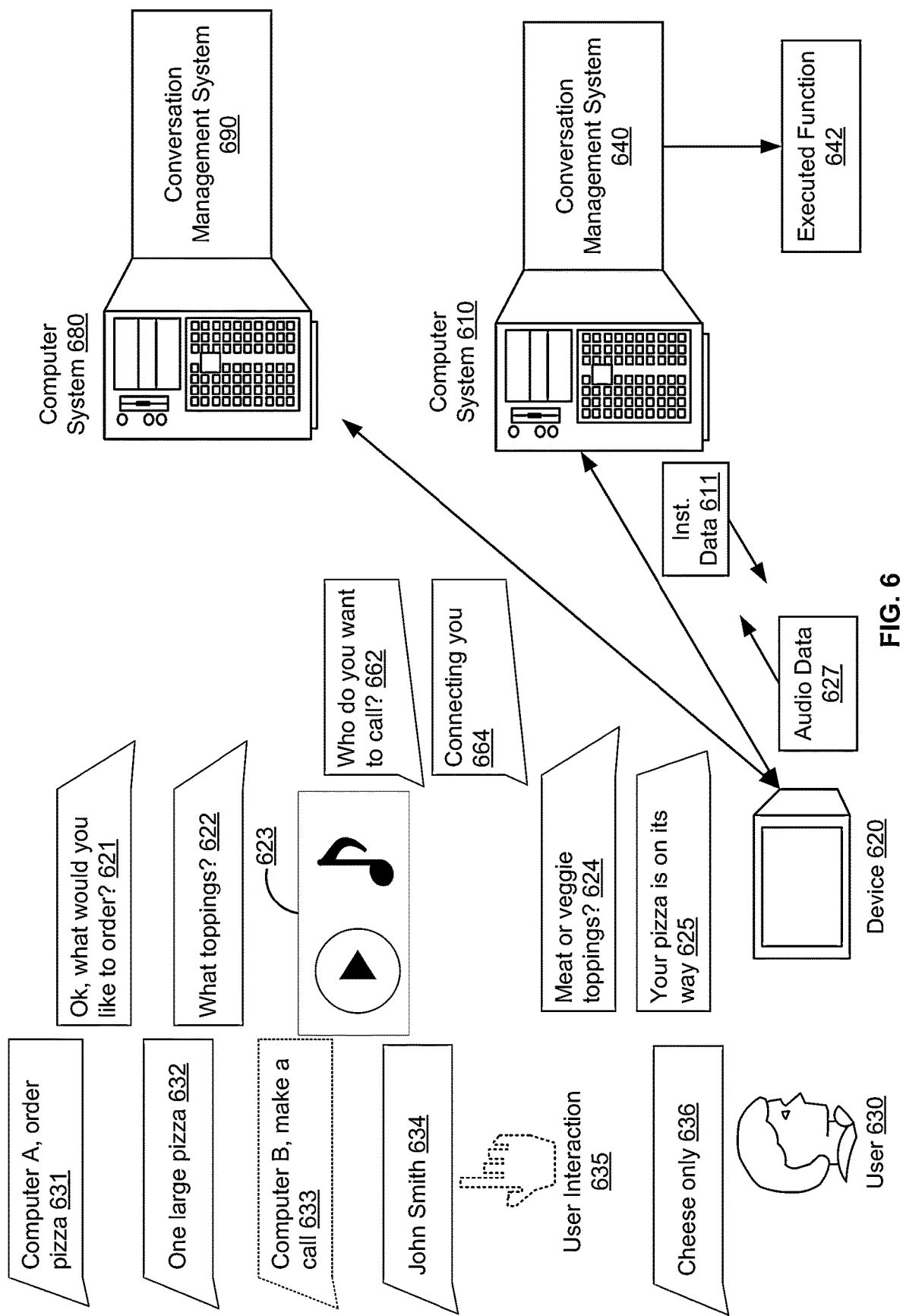
FIG. 6 illustrates an example of using multiple applications of a device for pausing and resuming of natural language conversations, according to embodiments of the present disclosure.

FIG. 6 illustrates an example of using multiple applications of a device 620 for pausing and resuming of natural language conversations, according to embodiments of the present disclosure. In the illustration, the device 620 supports multiple applications, each corresponding to a smart assistant. Each application can provide a particular function (e.g., a pizza ordering application, a phone call application, and the like) and can be triggered in a particular manner (via a corresponding wakeword, or via an operation of an input means that is integral to or interfaces with the device 620). Similar to the illustration of FIG. 5, the devices 620 supports a vocal input modality, a touch input modality, an audio output modality, and a graphical output modality. The vocal input modality can be used to pause a natural language conversation. The audio output modality can be used to indicate that the natural language conversation is paused. The graphical output modality can also be used to indicate that the natural language conversation is paused. The touch input modality can used to resume natural language conversation. The device 620 can be communicatively coupled with a computer system 610 that provides a conversation management system 640. The device 620, the computer system 610, and the conversation management system 640 are examples of the device 220, the computer system 210, and the conversation management system 240, respectively, of FIG. 2.

In the interest of clarity of explanation, the use cases of ordering pizza and making a phone call are also described herein. Of course, the embodiments of the present disclosure are not limited as such and similarly apply to any other use cases (e.g., playing a game, requesting driving directions to a point of interest, and the like). In addition, rather than detecting natural language utterances via the vocal input modality, natural language input can be received via the touch input modality (e.g., in a conversation window with a chat bot). Additionally or alternatively, rather than presenting natural language responses via the audio output modality, such responses can be presented via the graphical output modality (e.g., in the conversation window). In such situations, the speech processing can be adjusted (e.g., ASR need not be performed and TTS messages need not be used in the conversation management system 640).

The conversation starts with a first natural language utterance of a user 630, illustrated as "Computer A, order pizza" 631. The wakeword "Computer A" corresponds to a first application executable on the device 120: a pizza ordering application having program code stored on the device 620. The pizza ordering application can use particular modalities to interact with the user 630 (e.g., the vocal input modality and the audio output modality in order to give to the user 630 the perception of a dialog with a pizza ordering smart assistant). The pizza ordering application can also be associated with a first skill having program code stored on a remote computing component and executable to provide a pizza ordering function. As such, upon detecting the wakeword "Computer A," the device 620 executes the pizza ordering application. Based on the execution of the pizza ordering application, the device 620 generates and sends, to the computer system 610, audio data 627 corresponding to this natural language utterance. Upon speech processing of the audio data 627, the conversation management system 640 determines an intent for ordering pizza and that the particular pizza ordering skill can be invoked to execute a function that satisfies the intent. The conversation management system 640 also determines parameters that need to be collected for the execution and, based on these parameters and the particular skill, determines an interaction model (one having predefined states and/or one that is AI-driven) to use in the conversation. Based on the interaction model, the conversation management system 640 generates a first TTS message that is then included and sent in instruction data 611 to the device 620. Accordingly, the device 620 outputs (e.g., the pizza ordering application presents) a first natural language response based on the first TTS message, where this response is illustrated in FIG. 6 as "Ok, what would you like to order?" 621. The conversation management system 640 also generates session data indicating that a skill session is ongoing with the computing component that provides the pizza ordering skill, such that additional audio data can be processed without the need for the wakeword to be repeated.

Next, the device 620 detects a second natural language utterance of the user 630, illustrated as "One large pizza" 632. Based on the execution of the pizza ordering application, the device 620 generates and sends, to the computer system 610, audio data 627 corresponding to this natural language utterance. Upon speech processing of the audio data 627, the conversation management system 640 determines two tokens that correspond to two parameters: the amount of pizzas to order (e.g., one) and the pizza size (e.g., large). Based on the values of these two parameters, a state of the interaction model is updated such that a second TTS message is generated to request another parameter (e.g., toppings). The second TTS message is then included and sent in instruction data 611 to the device 620. Accordingly, the device 620 outputs e.g., the pizza ordering application presents) a second natural language response based on the second TTS message, where this response is illustrated in FIG. 6 as "What toppings?" 622.

Thereafter, the device 620 detects a third natural language utterance of the user 630, illustrated as "Computer B, make a phone call" 633. Here, the device 620 detects a second wakeword (e.g., Computer B) that triggers the execution of a second application: a phone call application. In particular, the wakeword "Computer B" corresponds to the phone call application having program code stored on the device 620. The phone call application can use particular modalities to interact with the user 630 (e.g., the vocal input modality and the audio output modality in order to give to the user 630 the perception of a dialog with a phone call smart assistant). The phone call application can also be associated with a second skill having program code stored on a remote computing component and executable to provide a phone call function. As such, upon detecting the wakeword "Computer B," the device 620 executes the phone call application. The execution of the phone call application can result in backgrounding the execution of the pizza ordering application on the device 620.

In a first example, the wakeword "Computer A" is associated with the computer system 610, whereas the wakeword "Computer B" is associated with a different computer system 680. For instance, the computer system 610 supports functionalities of a first smart assistant that can be invoked by the wakeword "Computer A" but not the wakeword "Computer B." Conversely, the computer system 680 supports functionalities of a second smart assistant that can be invoked by the wakeword "Computer B" but not the wakeword "Computer C." Because the wakeword "Computer B" is detected, the device 620 can send audio data corresponding to the subsequently detected audio to the computer system 680 rather than the computer system 610. Here, the conversation management system 680 can manage a second conversation to collect the values of the parameters needed to execute the phone calling function by the remote computing component. This management includes the processing of audio data from the device 620 and the sending of instruction data to the device 620, where the audio data and the instruction data are associated with the second conversation. In FIG. 6, this processing is illustrated by the presentation of a TTS message requesting the contact's information (shown as "Who do you want to call" 662), to which the user 630 responds with an utterance (shown as "John Smith" 634), followed by a presentation of another TTS message about the call being initiated (shown as "Connecting you" 664).

In this first example, the computer system 610 can determine one or more pause triggers associated with pausing the pizza ordering conversation. By not receiving audio data from the device 620 within a predefined time period after sending the instruction data 611 thereto, the computer system 610 can determine a pause trigger. Another pause trigger can be receiving, from the device 620, data indicating that the execution of the pizza ordering application is backgrounded and/or that another application is being executed.

Additionally, a "push to talk" approach can be used. In this case, a button (e.g., the physical button 150 of FIG. 1) can be pushed first, followed by a user utterance that includes the wakeword "Computer B." In this illustration, the device 620 generates and encrypts audio data based on the detected user utterance and send the encrypted audio data to the computer system 610 as well as the computer system 680. However, none of these two computer systems can decrypt the audio data until receiving the proper key from the device 620. In this case, the device 620 can verify the wakeword (e.g., determine whether the detected wakeword matches with "Computer A" or "Computer B") after the transmission of the encrypted audio data. Upon verifying that the wakeword is "Computer B," the device 620 sends the key to the computer system 680, but not the computer system 610. In this case, by not receiving the key within a predefined time period from receiving the encrypted audio data, the computer system 610 can determine a pause trigger.

In a second example, the wakeword "Computer A" and the wakeword "Computer B" are associated with the computer system 610. For instance, the computer system 610 supports functionalities of the two smart assistants. In this example, upon speech processing of the audio data 627, the conversation management system 640 determines an intent for making a phone call and that the particular phone call skill can be invoked to execute a function that satisfies the intent. Similar to the above description of the conversation management system 690, the conversation management system 640 can manage a second conversation to collect the values of the parameters needed to execute the phone calling function by the remote computing component.

In this second example, the determination of the different intent (e.g., a change from ordering pizza to making a phone call), the indication that the audio data is associated with a different application (e.g., a change from the pizza ordering application to the phone call application), and/or the indication that the pizza ordering application is backgrounded can be used as a trigger to pause the pizza ordering conversation (e.g., an implicit trigger). As described herein above, other explicit and/or implicit pause triggers are possible and, as such, the "Computer B, make a call" 633 natural language utterance is illustrated with a dotted dialog box. Based on the pause trigger, the conversation management system 640 updates the session data to indicate that the session associated with the pizza ordering conversation is paused and that the particular pizza ordering skill is backgrounded and stores contextual data associated with the session (e.g., the contextual data indicating the particular skill, the last requested parameter, and the like). In addition, the conversation management system 640 generates data indicating the pausing. This data is included in instruction data 611 sent to the device 620, where the device 620 outputs one or more indications 623 about the pausing. The one or more indications 623 can present a TTS message about the pausing (e.g. "You can get back to me") and/or a particular chime, where the TTS message and/or chime can be presented prior to the first TTS about the phone call (e.g., prior to "Who do you want to call 662). The one or more indications 623 can additionally or alternatively include a GUI component that indicates the pausing and the paused function and/or skill (e.g., by including text such as "Incomplete conversation— pizza," "Pizza ordering incomplete," "Click here to resume ordering pizza," or the like). Content of the GUI component can be populated with a portion of the contextual data. Alternatively, no pausing indication is presented by the device 620.

At a later point, the device 620 detects a user interaction 635 with the GUI component. For instance, the user interaction 635 is a selection (e.g., a tap, a double tap, a swipe, or some other gesture at the location at which the GUI component is presented). The device 620 generates and sends, to the computer system 610, data corresponding to the user interaction 635 (e.g., text data identifying the GUI component and indicating a selection thereof). Based on this data, the conversation management system 640 determines that the conversation is to be resumed. This determination corresponds to one example of an explicit resume trigger. As described herein above, other explicit and/or implicit resume triggers are possible and, as such, the user interaction 634 is illustrated with a dotted shape. For instance, the completion of the phone call can be used as a resume trigger. Different ways are possible to determine the completion. In one example, the device 620 can terminate the execution of the phone call application and send, to the computer system 610, data indicating this termination. Upon processing this data, the computer system 610 determines the completion. In another example, the computing component that executes the phone call skill can send similar data to the computer system 610. In another illustration, a physical resume button integrated or interfacing with the device 620 can be operated (e.g., pushed) to request the resuming of the pizza ordering conversation.

Based on the resume trigger, the conversation management system 640 updates the session data to indicate that the session associated with the pizza ordering conversation is resumed and that the particular skill is foregrounded and retrieves the contextual data associated with the session. In addition, the conversation management system 640 generates a third TTS message to request again the last requested parameter (e.g., toppings). The third TTS message may, but need not (as illustrated in FIG. 6), be the same as the second TTS message. The third TTS message is then included and sent in instruction data 611 to the device 620. The instruction data 611 can instruct the device 620 to resume the execution of the pizza ordering application in the foreground and to present the third TTS message. Accordingly, the device 620 outputs (e.g., the pizza ordering application presents) a third natural language response based on the third TTS message, where this response is illustrated in FIG. 6 as "Meat or veggie toppings?" 624.

The user 630 then replies to the third natural language response by providing a fourth natural language utterance, illustrated as "Cheese only" 636. Here also, based on the execution of the pizza ordering application in the foreground, the device 620 detects the fourth natural language utterance and generates and sends, to the computer system 610, corresponding audio data 627. Upon speech processing of the audio data 627, the conversation management system 640 determines a third token that correspond to a third parameter: the toppings (e.g., cheese). Of course, if other parameters need to be defined, the conversation can continue in a similar manner as described above. Additionally, the pausing and resuming can be repeated. Assuming that only the three parameters (quantity, size, and toppings) are needed to execute the function, the state of the interaction model is updated to indicate an end state corresponding to having all needed parameter values. The computer system 610 can then send, via an API, the parameter values to the computing component that provides the pizza ordering function, thereby causing an executed function 642 based on the values. The conversation management system 640 can also update the session data to indicate that the session has ended and can generate a fourth TTS message about the executed function 642. The fourth TTS message is then included and sent in instruction data 611 to the device 620. Accordingly, the device 620 (e.g., the pizza ordering application) outputs a fourth natural language response based on the fourth TTS message, where this response is illustrated in FIG. 6 as "Your pizza is on its way" 625.

Although FIG. 6 is described in connection with processing being performed on the computer system 610 (e.g., once a wakeword is detected), embodiments of the present disclosure are not limited as such. Instead, the processing (e.g., including at least the audio processing) can be performed locally on the device 620. For instance, upon detecting the wakeword "Computer A," the device 620 executes the pizza ordering application. The execution of this application configures the device 620 to provide audio processing functionalities related to natural language inputs and outputs for ordering a pizza. Similarly, upon detecting the wakeword "Computer B," the device 620 executes the phone call application. The execution of this application configures the device 620 to provide audio processing functionalities related to natural language inputs and outputs for making a phone call. In another illustration, the processing can be performed on the computer system 610 and on the device 620 depending on the triggered application. For instance, a wakeword "Computer C" can be associated with a third application: a generic smart assistant application having program code executable on the device 620. The computer system 610 can provide audio processing functionalities in support of the third application to determine requested functions and can communicate with a plurality of computing components, each of which providing one or more skills that provide one or more functions. In this illustration, the user 630 can utter the wakeword "Computer C" followed by a request for any of these functions (e.g., "Computer C, start a trivia game," "Computer C, I need to book travel arrangements," or "Computer C, I need to make a restaurant reservation," and the like). Upon detecting the wakeword "Computer C," the device 620 can execute the third application to generate and send audio data to the computer system 630 for processing (at least to manage the conversation and cause the execution of any requested function(s) and to present outputs to the user 630 (responses in the conversation that at least to cause interactions of the user 630). In comparison, upon detecting the "Computer B" wakeword, the subsequent audio data is locally processed on the device 620, where the device 620 may cause the execution of the requested function (e.g., making a phone call) without the need to exchange data with the computer system 610.

FIGS. 4-5 illustrate a single conversation that is paused and then resumed. However, the embodiments of the present disclosure are not limited as such. Instead, the embodiments similarly apply to a plurality of conversations. In particular, a first conversation can be paused and, while this first conversation is paused, a second conversation can be started. In fact, the intent associated with the second conversation can be used as an implicit pause trigger of the first conversation as illustrated in FIG. 6. The second conversation can end before the first conversation is resumed. In fact, the end of the second conversation can be used as an implicit resumed trigger of the first conversation as illustrated in FIG. 6. Alternatively, the second conversation can be paused and, while the second conversation is paused, the first conversation can be resumed. In fact, the pausing of the second conversation can be used as an implicit resumed trigger of the first conversation. Of course, a larger number of conversations can be managed sequentially, in parallel, or in an interleaving manner. Further, a first conversation can be paused and/or resumed to allow for the processing of a single interaction (rather than a second conversation, such as a single interaction that asks about the weather and does not necessitate a dialog to be managed by a conversation management system).

Figure 7:
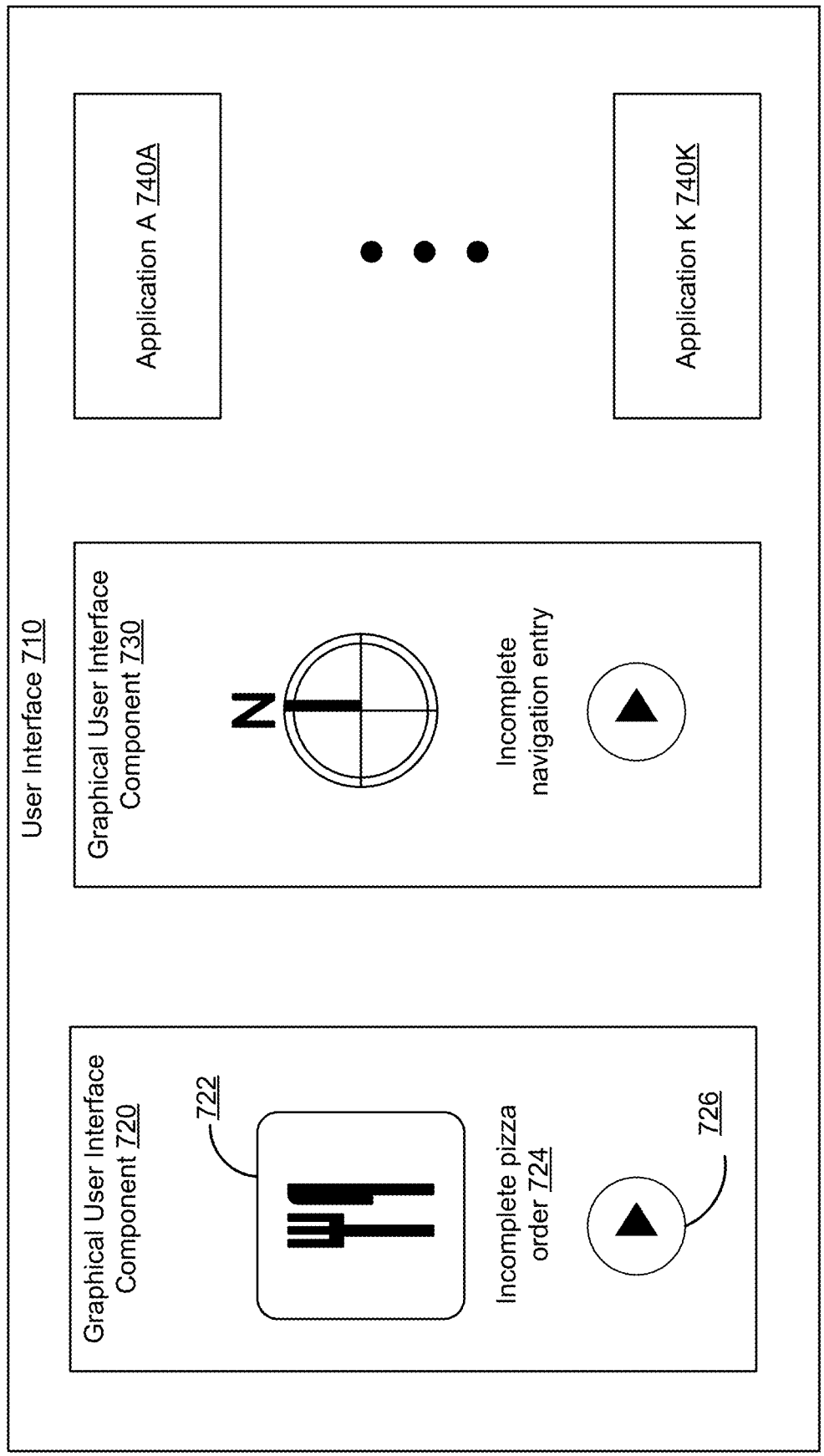
FIG. 7 illustrates an example of graphical user interface components indicating the pausing of natural language conversations and being selectable to resume such conversations, according to embodiments of the present disclosure.

FIG. 7 illustrates an example of GUI components indicating the pausing of natural language conversations and being selectable to resume such conversations, according to embodiments of the present disclosure. As illustrated, a user interface 710 of a device (e.g., the device 220 of FIG. 2)

includes a first GUI component 720 and a second GUI component 730. The first GUI component 720 corresponds to a first paused natural language conversation. Similarly, the second GUI component 730 corresponds to a second paused natural language conversation. The user interface 710 also includes icons of different applications (shown in FIG. 7 as "Application A 740A" through "Application K 740K"). The arrangement of the GUI components and icons and their sizes are provided herein for illustrative purposes only and other arrangements and/or sizes are possible.

Generally, a GUI component that corresponds to a paused natural language conversation indicates that the natural language conversation is paused and can be selectable to resume the paused natural language conversation. Contextual data can be stored about the paused natural language conversation and can indicate, among other things, the intent and/or topic of the paused natural language conversation, the requested function and/or skill, the last requested parameter, and the like. Content of the GUI component can be populated based on at least a portion of the contextual data. A computer system, such as the computer system 210 of FIG. 2, can send, to the device, the content in an object such as in an Application Programming Language (APL) object or any other types of objects. The object can also indicate presentation properties of the GUI component (e.g., height, width, location on screen, and the like). An application (e.g., a smart assistant application) can render the GUI component by parsing the object, determining the presentation properties, and presenting the content according to these properties.

Referring to the first GUI component 720, the corresponding first natural language conversation relates to a pizza ordering skill (as described in connection with FIG. 5). As such, the first GUI component 720 shows an icon 722 that indicates this pizza ordering skill, text 724 indicating an incomplete pizza order, and a control button 726 (e.g., a play button) selectable to resume this paused conversation. The collection or any of the icon 722, text 724, and control button 726 provides an indication that the first natural language conversation is paused. The second GUI component 730 can show similar content, except that such content is adapted to the corresponding second natural language conversation and is based on at least a portion of the contextual data of that second natural language conversation.

Upon a selection of the control button 726, the device can send data to a computer system (e.g., the computer system 210 of FIG. 2) indicating that the first natural language conversation is to be resumed. The device can also dismiss the presentation of the first GUI component 720 based on this selection.

In an example, an application (e.g., a voice agent or other type of a smart assistant) executes on the device and provides the vocal input modality for the first natural language conversation and presents the first GUI component 720. This application may, but need not, be associated with the application (or skill) that provides the requested function, and may, but need not, be different from the application that provides the vocal input modality for the second natural language conversation and presents the second GUI component 730. In this case, each of the first GUI components 720 and 730 can further indicate the corresponding application (e.g., the voice agent or other type of smart assistant).

In an illustrative use case of the two GUI components 710 and 720, consider the following. The first natural language conversation is ongoing. A first pause trigger is determined. At this point, the user interface UI 710 is updated to present the first GUI component 720. While this first natural language conversation is paused, the second natural language conversation starts and is ongoing. Subsequently, a second pause trigger is determined. At this point, the user interface UI 710 is updated to present the second GUI component 730. A user tap is then received on the first GUI 720, resulting in the resuming of the first natural language conversation, while the second natural language conversation remains paused. Accordingly, the first GUI component 720 is dismissed from the user interface 710, while the presentation of the second GUI component 730 continues on the user interface 710. In this illustrative example, the first pause trigger can be a natural language utterance of the user explicitly requesting the first natural language conversation to be paused (e.g., an explicit pause trigger) or requesting the second natural language conversation to start (e.g., an implicit pause trigger). Alternatively, the first pause trigger can be a gaze detected on an icon corresponding to an application other than the voice agent or other type of smart assistant that presents the first GUI component 720 (e.g., an implicit trigger). Another example implicit pause trigger can be an incoming phone call or a notification related to another application (which may have a priority higher than the one for ordering pizza).

Figure 8:
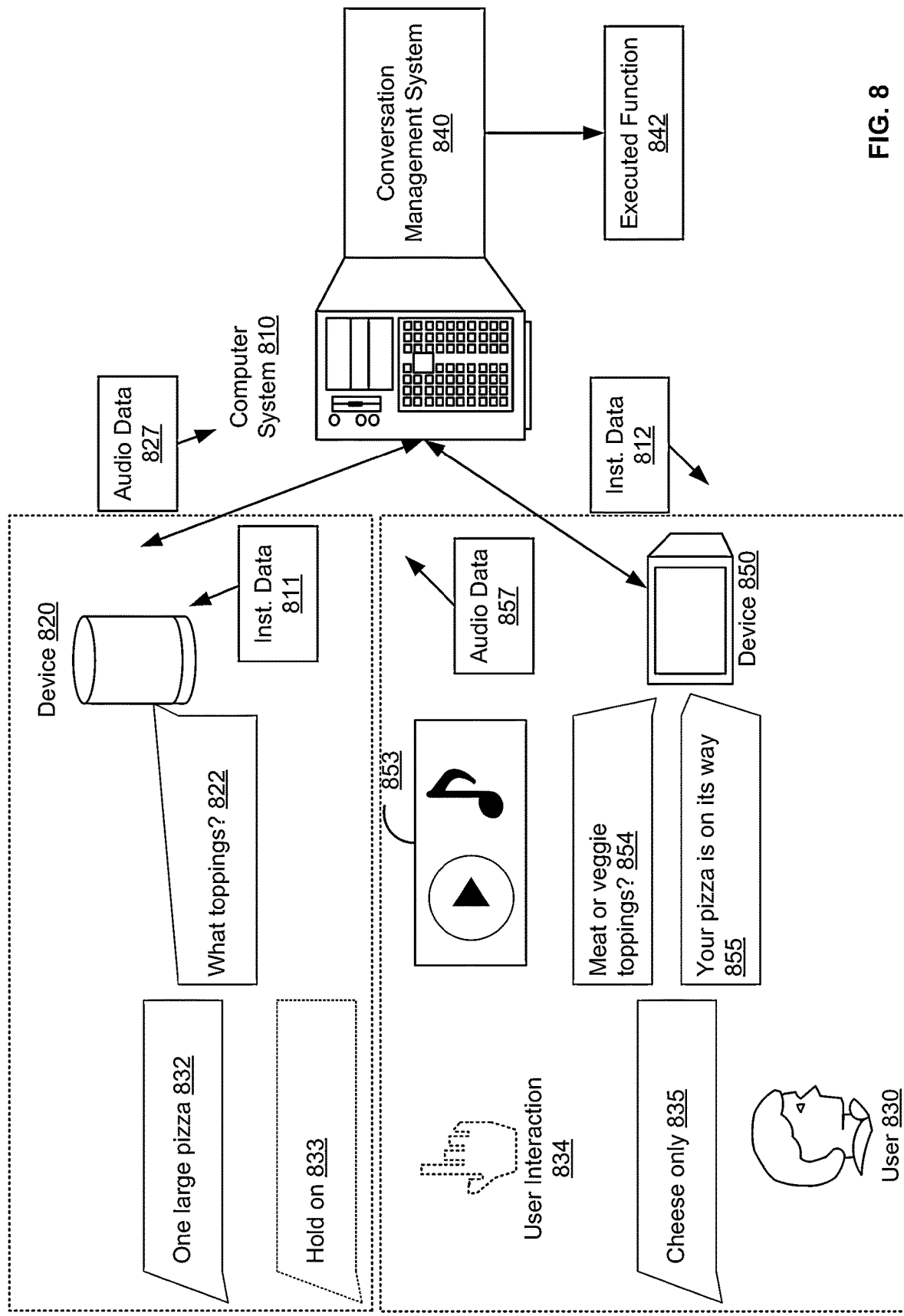
FIG. 8 illustrates an example of a multi-device environment for pausing and resuming of natural language conversations, according to embodiments of the present disclosure.

FIG. 8 illustrates an example of a multi-device environment for pausing and resuming of natural language conversations, according to embodiments of the present disclosure. The multi-device environment includes, among other things, a first device 820 and a second device 850 that are communicatively coupled with a computer system 810. The two devices 820 and 850 are associated with the same account and each are examples of the device 210 of FIG. 2. The computer system 810 provides a conversation management system 840, similar to the computer system 210 providing the conversation management system 240 in FIG. 2. Generally, a natural language conversation can be paused via a device (e.g., the first device 820 in FIG. 8) and resumed via another device associated with the same account (e.g., the second device 850 in FIG. 8). In the illustration of FIG. 8, the pausing is via a vocal input modality and the resuming is via a touch input modality, although other types of input and output modalities can be used as described in connection with FIGS. 4 and 5.

In the interest of clarity of explanation, the use case of ordering pizza is also described herein. Of course, the embodiments of the present disclosure are not limited as such and similarly apply to any other use cases (e.g., making a phone call, requesting driving directions to a point of interest, and the like). In addition, the embodiments need not be limited to two devices and can similarly apply to a larger number of devices.

Assume that the conversation has started (e.g., such as by being triggered with a first natural language utterance of a user 830 about ordering pizza, similar to "Computer, order pizza" 531 in FIG. 5). The first device 820 detects a second natural language utterance of the user 830, illustrated as "One large pizza" 832. The first device 820 generates and sends, to the computer system 810, audio data 827 corresponding to this natural language utterance. Upon speech processing of the audio data 827, the conversation management system 840 determines two tokens that correspond to two parameters: the amount of pizzas to order (e.g., one) and the pizza size (e.g., large). Based on the values of these two parameters, a state of the relevant interaction model is updated such that a TTS message is generated to request another parameter (e.g., toppings). The TTS message is then included and sent in instruction data 811 to the first device 820. Accordingly, the first device 820 outputs a natural language response based on the TTS message, where this response is illustrated in FIG. 8 as "What toppings?" 822.

Thereafter, the first device 820 detects a third natural language utterance of the user 830, illustrated as "Hold on" 833. The first device 820 generates and sends, to the computer system 810, audio data 827 corresponding to this natural language utterance. Upon speech processing of the audio data 827, the conversation management system 840 determines a keyword or an intent to pause the conversation. This determination corresponds to one example of an explicit pause trigger. As described herein above, other explicit and/or implicit pause triggers are possible and, as such, the "Hold on" 833 natural language utterance is illustrated with a dotted dialog box. Based on this determination, the conversation management system 840 updates the session data to indicate that the session is paused and that the particular skill is backgrounded and stores contextual data associated with the session (e.g., the contextual data indicating the particular skill, the last requested parameter, and the like). In addition, the conversation management system 840 generates data indicating the pausing. This data is included in instruction data 812 sent to the second device 850, where the second device 850 outputs one or more indications 853 about the pausing. The one or more indications 853 can present a TTS message about the pausing (e.g. "You can get back to me") and/or a particular chime. The one or more indications 853 can also include a GUI component that indicates the pausing and the paused function and/or skill (e.g., by including text such as "Incomplete conversation—pizza," "Pizza ordering incomplete," "Click here to resume ordering pizza," or the like). Content of the GUI component can be populated with a portion of the contextual data. Of course, similar instruction data can be sent to the first device 820, causing the first device 820 to also output one or more indications about the pausing.

At a later point, the second device 850 detects a user interaction 834 with the GUI component. For instance, the user interaction 834 is a selection (e.g., a tap, a double tap, a swipe, or some other gesture at the location at which the GUI component is presented). The second device 850 generates and sends, to the computer system 810, data corresponding to the user interaction 834 (e.g., text data identifying the GUI component and indicating a selection thereof). Based on this data, the conversation management system 840 determines that the conversation is to be resumed. This determination corresponds to one example of an explicit resume trigger. As described herein above, other explicit and/or implicit resume triggers are possible and, as such, the user interaction 834 is illustrated with a dotted shape. Based on this determination, the conversation management system 840 updates the session data to indicate that the session is resumed and that the particular skill is foregrounded and retrieves the contextual data associated with the session. In addition, the conversation management system 840 generates a TTS message to request again the last requested parameter (e.g., toppings). The TTS message may, but need not (as illustrated in FIG. 8), be the same as the TTS message previously sent to the first device 820. This TTS message is then included and sent in instruction data 812 to the second device 850. Accordingly, the second device 850 outputs a third natural language response based on the TTS message, where this response is illustrated in FIG. 8 as "Meat or veggie toppings?" 854.

The user 830 then replies to the third natural language response by providing a fourth natural language utterance, illustrated as "Cheese only" 835. Here, the second device 850 detects the fourth natural language utterance and generates and sends, to the computer system 810, corresponding audio data 857. Upon speech processing of the audio data 857, the conversation management system 840 determines a third token that corresponds to a third parameter: the toppings (e.g., cheese). Of course, if other parameters need to be defined, the conversation can continue in a similar manner as described above. Additionally, the pausing and resuming can be repeated. Assuming that only the three parameters (quantity, size, and toppings) are needed to execute the function, the state of the interaction model is updated to indicate an end state corresponding to having all needed parameter values. The computer system 810 can then send, via an API, the parameter values to the computing component that provides the function, thereby causing an executed function 842 based on the values. The conversation management system 840 can also update the session data to indicate that the session has ended and can generate a TTS message about the executed function 842. This TTS message is then included and sent in instruction data 812 to the second device 850. Accordingly, the second device 850 outputs a fourth natural language response, where this response is illustrated in FIG. 8 as "Your pizza is on its way" 855.

Figure 9:
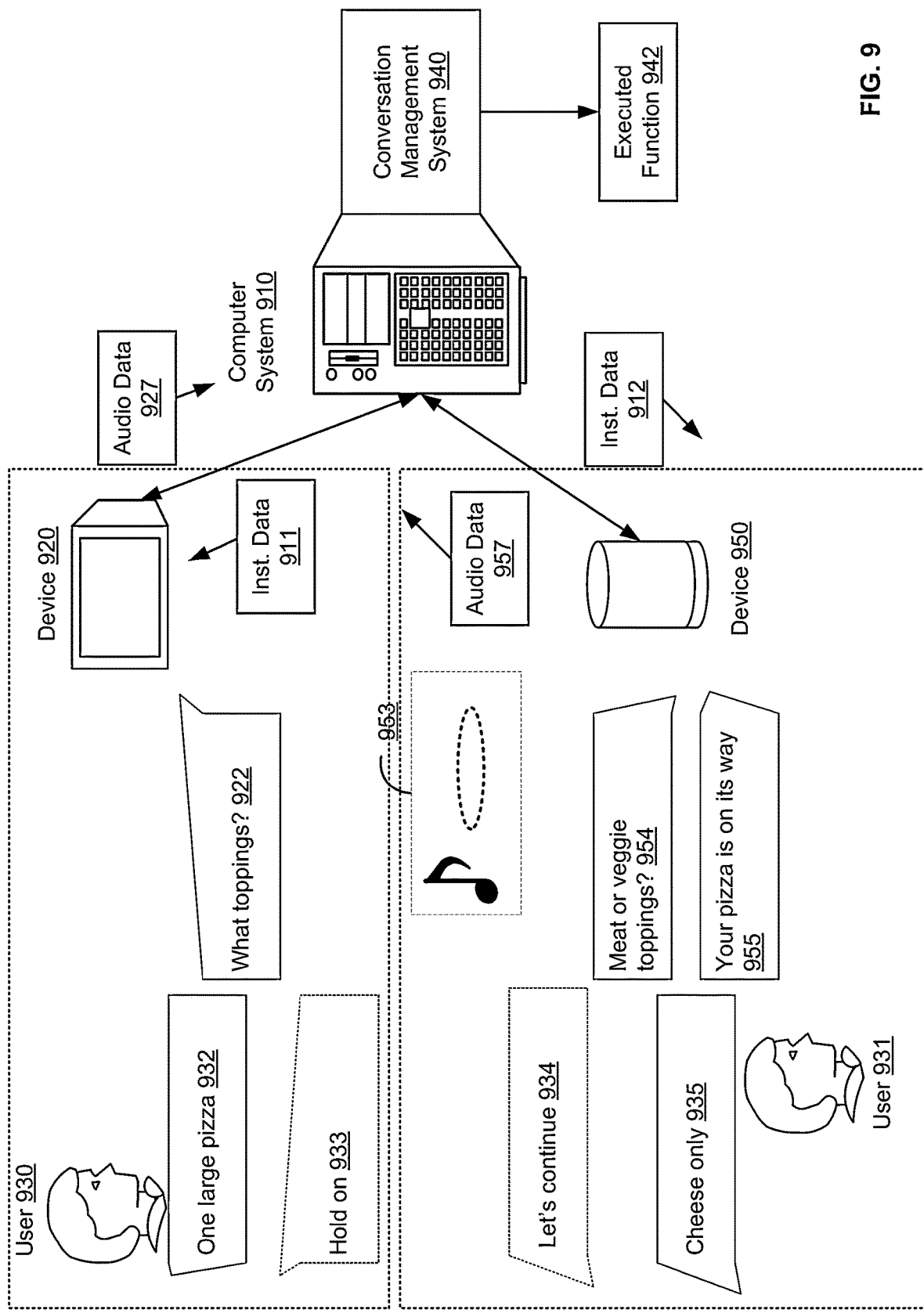
FIG. 9 illustrates an example of a multi-user environment for pausing and resuming of natural language conversations, according to embodiments of the present disclosure.

FIG. 9 illustrates an example of a multi-user environment for pausing and resuming of natural language conversations, according to embodiments of the present disclosure. The multi-user environment includes, among other things, a first user 930 and a second user 931. The first user 930 may operate a first device 920, whereas the second user 931 may operate a second device 950. The two devices 920 and 950 are communicatively coupled with a computer system 910, are associated with the same account, and each are examples of the device 210 of FIG. 2. The computer system 910 provides a conversation management system 940, similar to the computer system 210 providing the conversation management system 240 in FIG. 2. Generally, a first user can pause a natural language conversation, and a second user can resume the natural language conversation. In the illustration of FIG. 9, the pausing is via the first device 920, and the resuming is via the second device 950, although it is possible that the pausing and the resuming are via the same device. In the illustration of FIG. 9, the pausing is via a vocal input modality and the resuming is via also a vocal input modality, although other types of input and output modalities can be used as described in connection with FIGS. 4 and 5.

Assume that the conversation has started (e.g., such as by being triggered with a first natural language utterance of the first user 930 about ordering pizza, similar to "Computer, order pizza" 531 in FIG. 5). The first device 920 detects a second natural language utterance of the first user 930, illustrated as "One large pizza" 932. The first device 920 generates and sends, to the computer system 910, audio data 927 corresponding to this natural language utterance. Upon speech processing of the audio data 927, the conversation management system 940 determines two tokens that correspond to two parameters: the amount of pizzas to order (e.g., one) and the pizza size (e.g., large). Based on the values of these two parameters, a state of the relevant interaction model is updated such that a TTS message is generated to request another parameter (e.g., toppings). The TTS message is then included and sent in instruction data 911 to the first device 920. Accordingly, the first device 920 outputs a natural language response based on the TTS message, where this response is illustrated in FIG. 9 as "What toppings?" 922.

Thereafter, the first device 920 detects a third natural language utterance of the first user 930, illustrated as "Hold on" 933. The first device 920 generates and sends, to the computer system 910, audio data 927 corresponding to this natural language utterance. Upon speech processing of the audio data 927, the conversation management system 940 determines a keyword or an intent to pause the conversation. This determination corresponds to one example of an explicit pause trigger. As described herein above, other explicit and/or implicit pause triggers are possible and, as such, the "Hold on" 933 natural language utterance is illustrated with a dotted dialog box. Based on this determination, the conversation management system 940 updates the session data to indicate that the session is paused and that the particular skill is backgrounded and stores contextual data associated with the session (e.g., the contextual data indicating the particular skill, the last requested parameter, and the like). In addition, the conversation management system 940 generates data indicating the pausing. This data is included in instruction data 912 sent to the second device 950, where the second device 950 outputs one or more indications 953 about the pausing. The one or more indications 953 can present a TTS message about the pausing (e.g. "You can get back to me") and/or a particular chime. The one or more indications 953 can also involve the use of a flashing pattern of light having a particular color. Of course, similar instruction data can be sent to the first device 920, causing the first device 920 to also output one or more indications about the pausing.

At a later point, the second device 950 detects a fourth natural language utterance of the second user 931, illustrated as "Let's continue" 934. This utterance need not include the wakeword because the state of the session is paused rather than terminated. Alternatively, this utterance may only be processed if it includes the wakeword. In both situations, the second device 950 generates and sends to the computer system 910 audio data 957 corresponding to the fourth natural language utterance. Upon speech processing of the audio data 957, the conversation management system 940 determines a keyword or an intent to resume the conversation. This determination corresponds to one example of an explicit resume trigger. As described herein above, other explicit and/or implicit resume triggers are possible and, as such, the "Let's continue" 934 natural language utterance is illustrated with a dotted dialog box. Based on this determination, the conversation management system 940 updates the session data to indicate that the session is resumed and that the particular skill is foregrounded and retrieves the contextual data associated with the session. In addition, the conversation management system 940 generates a TTS message to request again the last requested parameter (e.g., toppings). The TTS message may, but need not (as illustrated in FIG. 9), be the same as the TTS message previously sent to the first device 920. This TTS message is then included and sent in instruction data 912 to the second device 950. Accordingly, the second device 950 outputs a third natural language response based on the TTS message, where this response is illustrated in FIG. 9 as "Meat or veggie toppings?" 954.

In an example, the first device 920 and the second device 950 are associated with the same account. Furthermore, for the resuming to be performed, the first user 930 and the second user 931 may need to be associated with the same account too. For example, a first voiceprint of the first user's 930 voice may be stored in association with the account. Similarly, a second voiceprint of the second user's 931 voice may be also stored in association with the account. Upon receiving the audio data 957 requesting the resuming, the conversation management system 940 can generate a voiceprint therefrom for comparison to voiceprints stored in association with the account. If a match is found (e.g., the second voiceprint is matched), the conversation management system 940 determines that the resuming is authorized. Otherwise, a determination may be made that the resuming is prohibited.

The second user 931 then replies to the third natural language response by providing a fifth natural language utterance, illustrated as "Cheese only" 935. Here, the second device 950 detects the fifth natural language utterance and generates and sends, to the computer system 910, corresponding audio data 957. Upon speech processing of the audio data 957, the conversation management system 940 determines a third token that correspond to a third parameter: the toppings (e.g., cheese). Of course, if other parameters need to be defined, the conversation can continue in a similar manner as described above. Additionally, the pausing and resuming can be repeated. Assuming that only the three parameters (quantity, size, and toppings) are needed to execute the function, the state of the interaction model is updated to indicate an end state corresponding to having all needed parameter values. The computer system 910 can then send, via an API, the parameter values to the computing component that provides the function, thereby causing an executed function 942 based on the values. The conversation management system 940 can also update the session data to indicate that the session has ended and can generate a TTS message about the executed function 942. The TTS message is then included and sent in instruction data 912 to the second device 950. Accordingly, the second device 950 outputs a fourth natural language response based on the TTS message, where this response is illustrated in FIG. 9 as "Your pizza is on its way" 955.

In an additional or alternative example, the contextual data is associated with a set of users, in addition to being associated with the conversation. The user association can involve user identifiers, such as voiceprints, corresponding to users authorized to participate in the conversation. In this way, multiple users can be involved and the input of each user can be associated with the corresponding user and processed as such to drive portions of the conversation. For instance, the first user 930 can request a first pizza (e.g., a large cheese pizza), whereas the second user 931 can request a second pizza (e.g., a medium pepperoni pizza), where these two requests can be part of the same conversation. While the first user 930 is requesting their pizza (e.g., a large cheese pizza) and before completing their request (e.g., before indicating that their requested large pizza should only have cheese), the conversation can be paused. At this point, contextual data is stored indicating that the last requested parameter is "toppings" and this contextual data is associated with a first user identifier corresponding to the first user 930 (e.g., the first under identifier includes the first voiceprint). At a later point, the second user 931 can resume the conversation. Here, a second user identifier is used to identify the second user 931 (e.g., the second user identifier includes the second voiceprint generated from the audio data requesting the resuming). Because the stored contextual data is unassociated with the second user identifier, the resuming of the conversation does not involve requesting again the last requested parameter (e.g. the toppings) needed to order the first pizza. Instead, the conversation can resume by requesting a different parameter (e.g., "What size pizza would you like to order") needed to order the second pizza. The contextual data need not be deleted and can still be used.

In particular, upon another pausing of the conversation (by either users 930 or 931) and subsequent resuming thereof by the first user 930, or upon user input detected to be of the first user 930 without the conversation being paused and resumed again, the contextual data can be used to re-request the toppings of the first pizza. As such, inputs of both users 930 and 931 can be processed in association with each user identifier such that the conversation can be completed and result, based on such inputs, in the definition of parameters for the execution of the function (e.g., two pizzas: a large one with cheese only for the first user 930 and a medium one with pepperoni for the second user 931).

Figure 10:
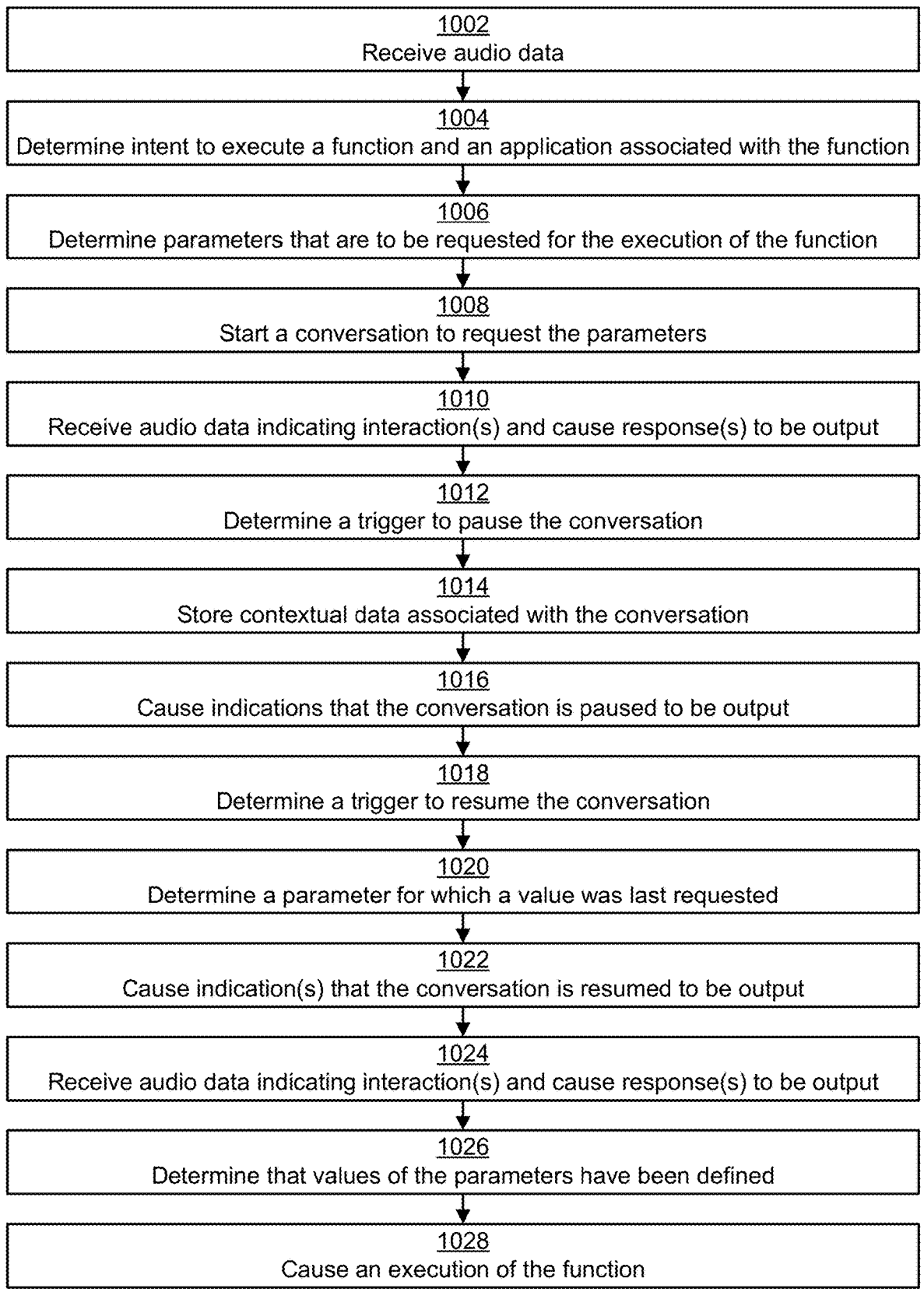
FIG. 10 illustrates an example of a flow for pausing and resuming a natural language conversation in association with an execution of a function, according to embodiments of the present disclosure.
Figure 11:
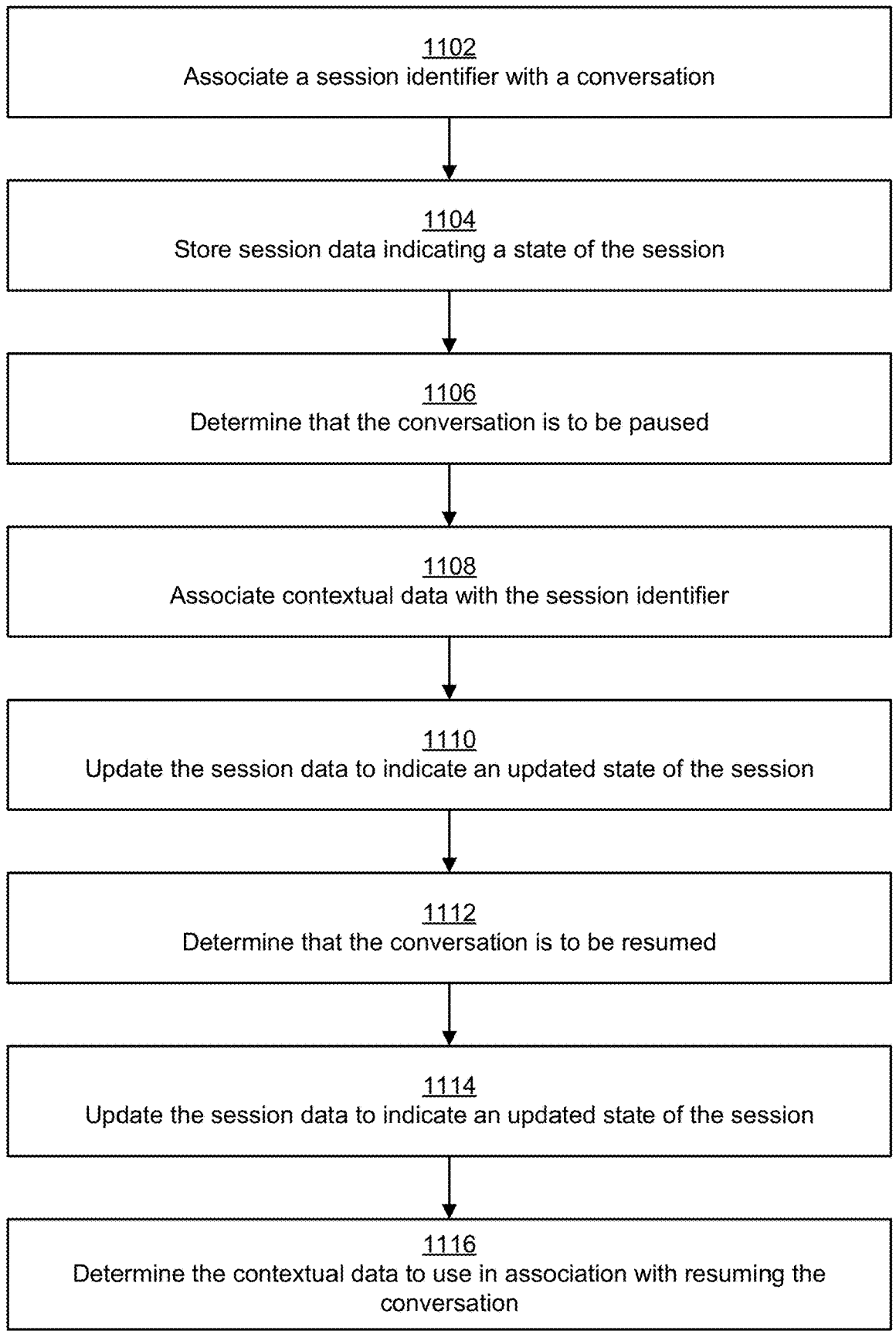
FIG. 11 illustrates an example of a flow for managing a session associated with a conversation, according to embodiments of the present disclosure.

FIGS. 10-11 illustrates examples of flows for computer system-based pausing and resuming of natural language conversations, according to embodiments of the present disclosure. Operations of the flows can be performed by a computer system, such as the computer system 110 of FIG. 1. Some or all of the instructions for performing the operations can be implemented as hardware circuitry and/or stored as computer-readable instructions on a non-transitory computer-readable medium of the computer system. As implemented, the instructions represent components that include circuitry or code executable by processor(s) of the computer system. The use of such instructions configures the computer system to perform the specific operations described herein. Each circuitry or code in combination with the relevant processor(s) represents a means for performing a respective operation(s). While the operations are illustrated in a particular order, it should be understood that no particular order is necessary and that one or more operations may be omitted, skipped, performed in parallel, and/or reordered.

FIG. 10 illustrates an example of a flow for pausing and resuming a natural language conversation in association with an execution of a function, according to embodiments of the present disclosure. The flow is described in connection with processing of audio data, although the embodiments of the present disclosure are not limited as such as described herein above. The flow may start at operation 1002, where the computer system receives audio data. For instance, the audio data is received from a device and corresponds to a natural language utterance detected by the device.

In an example, the flow may also include operation 1004, where the computer system determines an intent to execute a function and an application associated with the function. For instance, speech processing (e.g., ASR and NLU) is performed on the audio data to determine the intent, where this intent requests the execution of the function (e.g., referring to the pizza ordering example, the intent is determined to be for ordering pizza). Based on the function, the computer system determines an application that provides the function (e.g., a skill that supports pizza ordering). In an illustration, different applications can be registered with the computer system and the registration can indicate the function(s) that each supports. As such, the computer system can look up the registration information to determine the application that supports the intended function. In another example, the speech processing can also result in identifying the application directly (e.g., the natural language utterance includes "Order pizza from Pizza ABC app") or an entity responsible for the application (e.g., the natural language utterance includes "Order pizza from Restaurant XYZ"). In the latter example, the registration information is looked up using the entity's identifier (e.g., "Restaurant XYZ").

In an example, the flow may also include operation 1006, where the computer system determines parameters that are to be requested for the execution of the function. For instance, the registration information also indicates the parameters needed for the execution. As such, the computer system can look up the information to identify these parameters.

In an example, the flow may also include operation 1008, where the computer system starts a conversation to request the parameters. For instance, the computer system starts an application session (e.g., a skill session) by sending a session request to a computing component that stores the program code of the application. A response is received back from the computing component indication that the skill session is to remain open or ongoing. The computer system associates the application session with a session identifier and generates session data indicating a state of the application session. The state can be set to open or ongoing, and the session data can be associated with the session identifier. The computer system can also identify an interaction model associated with the application. An initial state of the interaction model can indicate one or more of the parameters to request (and/or in the case of an AI-driven approach, the output of the interaction model indicates a TTS message to use, where this message requests the parameter(s)). The computer system can then generate a TTS message to request the value(s) of the parameter(s). The TTS message is sent to the device in instruction data, causing the device to present the TTS message as a natural language response to the natural language utterance.

In an example, the flow may also include operation 1010, where the computer system receives audio data indicating interaction(s) and causes response(s) to the interaction(s) to be output. For instance, each interaction can correspond to a natural language utterance. Speech processing is performed on the audio data of each natural language utterance to determine one or more tokens. Each determined token corresponds to a value of a parameter. Given the determined parameter value(s), the state of the interaction model is updated. The updated state in turn indicates the next one or more of the parameters to request (and/or in the case of an AI-driven approach, the output of the interaction model indicates the next TTS message to use, where this message request the parameter(s)). The corresponding instruction data is sent to the device, causing this device to present natural language responses.

In an example, the flow may also include operation 1012, where the computer system determines a trigger to pause the conversation. In an illustration, the pause trigger is an explicit trigger. For instance, the computer system receives, from the device, audio data that represents a natural language utterance requesting the pausing. Speech processing is performed on the audio data to identify a predefined keyword that corresponds to the pause trigger and/or an intent to pause. In another illustration, the pause trigger is implicit. For instance, the computer system receives, from the device, audio data that represents a natural language utterance requesting a different function. Speech processing is performed on the audio data to identify a different intent or a different function, and this change can be determined to be an implicit pause trigger. Additionally or alternatively, the computer system can determine that no natural language utterance was detected within a time period from the last natural language response and, based on progress of the conversation, can determine the implicit pause trigger. Additionally or alternatively, the computer system can receive data from the device indicating that a user's attention changed to an application of the device other than a voice agent or other type of a smart assistant that presents the natural language responses.

In an example, the flow may also include operation 1014, where the computer system stores contextual data associated with the conversation. For instance, the contextual data indicates the requested function and/or application, the determined parameter values, the remaining parameter values to be determined, the last sent TTS message, the last requested parameter, and the like. The computer system can store this contextual data in association with the session identifier. The computer system can also update the session data to set a state of the session to paused and a state of the application to backgrounded.

In an example, the flow may also include operation 1016, where the computer system causes indications that the conversation is paused to be output. For instance, the computer system sends instruction data to the device, where the instruction data causes the devices to present the indications. The instructions data can include a TTS message indicating the pausing (e.g., "You can get back to me"). The instructions can also include object attributes for the presentation of a GUI component. Some of the object attributes can be set based on at least a portion of the contextual data such that, when presented, the content of the GUI content is based on this portion. In an illustration, the object attributes indicate the requested function and/or application and text about incompletion of the conversation.

In an example, the flow may also include operation 1018, where the computer system determines a trigger to resume the conversation. In an illustration, the resume trigger is an explicit trigger. For instance, the computer system receives, from the device, audio data that represents a natural language utterance requesting the resuming. Speech processing is performed on the audio data to identify a predefined keyword that corresponds to the resume trigger and/or an intent to resume. In another illustration, the computer system receives, from the device, data indicating a selection of the GUI component. In yet another illustration, the resume trigger is implicit. For instance, the computer system receives, from the device, data indicating that the user's attention changed back to the voice agent or other type of the smart assistant that presents the natural language responses. The computer system can also update the session data to set a state of the session to resumed and the state of the application to foregrounded.

In an example, the flow may also include operation 1020, where the computer system determines a parameter for which a value was last requested. For instance, the computer system looks up the contextual data to identify a parameter that was used in the last TTS message and for which no value has been determined yet.

In an example, the flow may also include operation 1022, where the computer system causes indication(s) that the conversation is resumed to be output. For instance, the computer system sends instruction data to the device, where the instruction data cause the devices to present the indications. The instruction data can be based on the contextual data. In particular, the instructions data can include a TTS message indicating the resuming. The content of the TTS message can indicate the parameter (e.g., if the parameter is for pizza toppings, the TTS message can include "Meat or veggie toppings?").

In an example, the flow may also include operation 1024, where the computer system receives audio data indicating interaction(s) and causes response(s) to the interaction(s) to be output. For instance, each interaction can correspond to a natural language utterance following the resuming of the conversation. Speech processing is performed on the audio data of each natural language utterance to determine one or more tokens. Each determined token corresponds to a value of a parameter. Given the determined parameter value(s), the state of the interaction model is updated. The updated state in turn indicates the next one or more of the parameters to request (and/or in the case of an AI-driven approach, the output of the interaction model indicates the next TTS message to use, where this message request the parameter(s)). The corresponding instruction data is sent to the device, causing this device to present natural language responses.

In an example, the flow may also include operation 1026, where the computer system determines that values of the parameters have been defined. For instance, upon the speech processing of the different audio data, the values are determined and the computer system checks if any of the parameter determined at operation 1006 remained undefined. If not, the computer system determines that all the values needed for the execution of the function are defined. In another illustration, upon updating the state of the interaction model, the update results in reaching an end state corresponding to having all the values defined.

In an example, the flow may also include operation 1028, where the computer system causes an execution of the function. For instance, the computer systems sends the value, via an API, to the computing component and receives a response to end the application session. The session data is updated to indicate the end of the session. The computer system also sends, to the device, instruction data to present a TTS message about the execution of the function.

FIG. 11 illustrates an example of a flow for managing a session associated with a conversation, according to embodiments of the present disclosure. The flow may start at operation 1102, where the computer system associates a session identifier with a conversation. For instance, the session identifier corresponds to an application session (a skill session) and is stored as a value in a key-value pair, whereas an identifier of the conversation is stored as a key of the key-value pair.

In an example, the flow may also include operation 1104, where the computer system stores session data indicating a state of the session. For instance, the session data is stored in a first data structure that can be using the session identifier. The data structure includes first data indicating that the state is ongoing (open, active, or the like). The session data can also include second data indicating a state of the application (e.g., the skill), such a foregrounded state.

In an example, the flow may also include operation 1106, where the computer system determines that the conversation is to be paused. As described herein above in connection with operation 1012, an implicit pause trigger and/or an explicit pause trigger can be determined.

In an example, the flow may also include operation 1108, associates contextual data with the session identifier. For instance, the computer system stores the contextual information in a second data structure that can be looked up using the session identifier.

In an example, the flow may also include operation 1110, where the computer system updates the session data to indicate an updated state of the session. For instance, the conversation identifier is used to look up key-value pairs. Based on this look-up, a value is returned and indicates the session identifier. The session identifier is then used to determine the session data by looking up the first data structure. The first data structure is updated to set the state of the session to paused by replacing the first data with third data indicating the paused state. Additionally, the first data structure can be updated to set the state of the application to backgrounded by replacing the second data with fourth data indicating the backgrounded state.

In an example, the flow may also include operation 1112, where the computer system determines that the conversation is to be resumed. As described herein above in connection with operation 1018, an implicit resume trigger and/or an explicit resume trigger can be determined.

In an example, the flow may also include operation 1114, where the computer system updates the session data to indicate an updated state of the session. For instance, the conversation identifier is used to look up key-value pairs. Based on this look-up, a value is returned and indicates the session identifier. The session identifier is then used to determine the session data by looking up the first data structure. The first data structure is updated to set the state of the session to resumed by replacing the third data with fifth data indicating the resumed state. Additionally, the first data structure can be updated to set the state of the application to foregrounded by replacing the fourth data with sixth data indicating the foregrounded state.

In an example, the flow may also include operation 1116, where the computer system determines contextual data to use in association with resuming the conversation. For instance, the identifier is used to determine the contextual data by looking up the second data structure.

Figure 12:
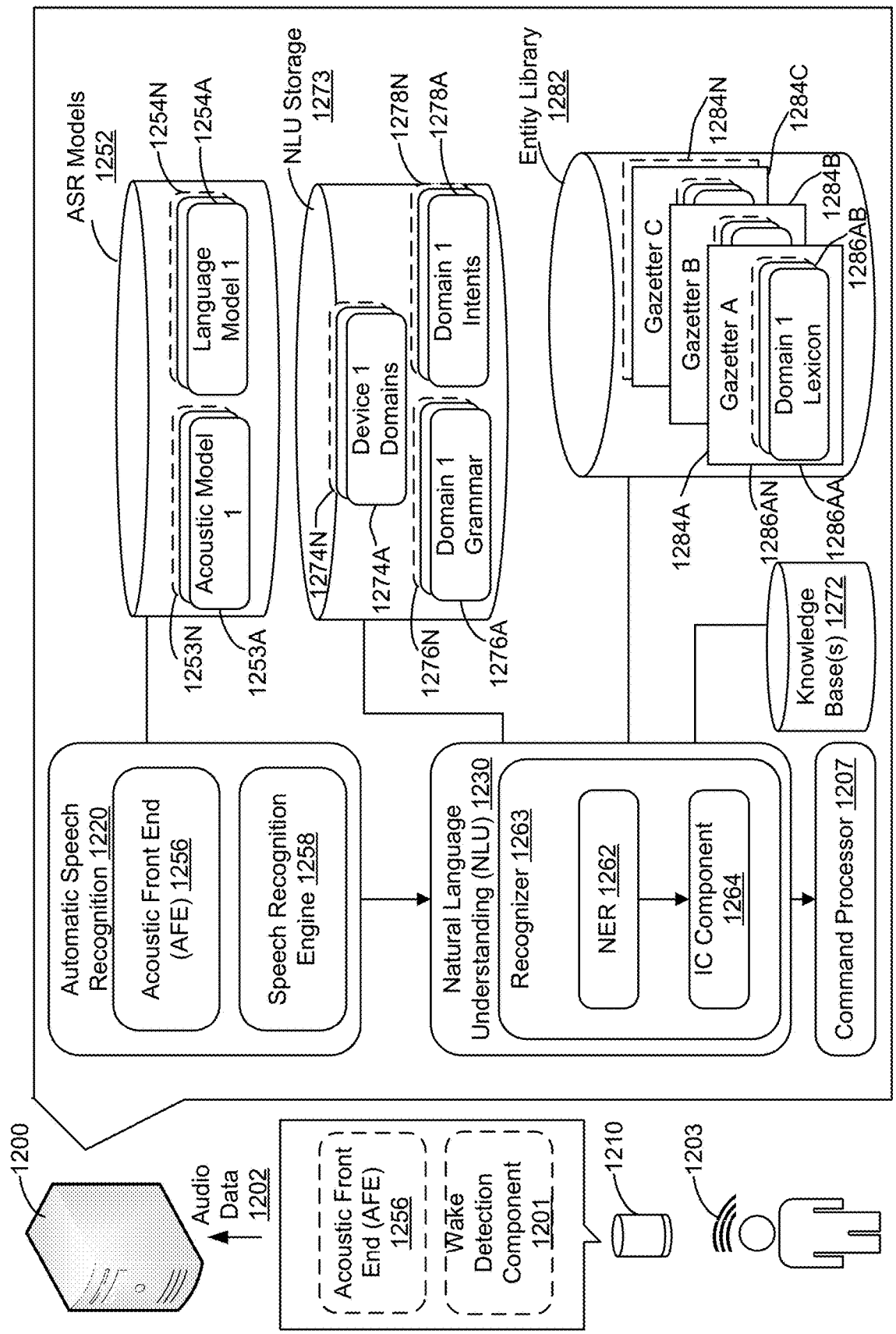
FIG. 12 illustrates an example of components of a device and a computer system, according to embodiments of the present disclosure.

FIG. 12 illustrates a conceptual diagram of how a spoken utterance can be processed, allowing a system to capture and execute commands spoken by a user, such as spoken commands that may follow a wakeword, or trigger expression (e.g., a predefined word or phrase for "waking" a device, causing the device to begin sending audio data to a remote system). The various components illustrated may be located on a same or different physical devices. Communication between various components illustrated in FIG. 12 may occur directly or across a network. An audio capture component, such as a microphone of a device 1210, captures audio 1203 corresponding to a spoken utterance. The device 1210 (an example of the device 220 of FIG. 2), using a wakeword detection component 1201, then processes audio data corresponding to the audio 1203 to determine if a keyword (such as a wakeword) is detected in the audio data. Following detection of a wakeword, the device 1210 sends audio data 1202 corresponding to the utterance to a computer system 1200 (an example of the computer system 210 of FIG. 2) that includes an ASR component 1220. The ASR component 1220 can be a part of a conversation management system.

The audio data 1202 may be output from an optional acoustic front end (AFE) 1256 located on the device prior to transmission. In other instances, the audio data 1202 may be in a different form for processing by a remote AFE 1256, such as the AFE 1256 located with the ASR component 1220 of the computer system 1200.

The wakeword detection component 1201 works in conjunction with other components of the user device, for example a microphone to detect keywords in audio 1203. For example, the device may convert audio 1203 into audio data, and process the audio data with the wakeword detection component 1201 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wakeword detection component 1201 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection component 1201 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 1210 may "wake" and begin transmitting audio data 1202 corresponding to input audio 1203 to the computer system 1200 for speech processing. Audio data corresponding to that audio may be sent to the computer system 1200 for routing to a recipient device or may be sent to the computer system 1200 for speech processing for interpretation of the included speech (either for purposes of enabling voice-communications and/or for purposes of executing a command in the speech). The audio data 1202 may include data corresponding to the wakeword, or the portion of the audio data corresponding to the wake-word may be removed by the local device 1210 prior to sending. Further, a local device may "wake" upon detection of speech/spoken audio above a threshold, as described herein. Upon receipt by the remote computer system 1200, an ASR component 1220 may convert the audio data 1202 into text. The ASR transcribes audio data into text data representing the words of the speech contained in the audio data 1202. The text data may then be used by other components for various purposes, such as executing system commands, inputting data, etc. A spoken utterance in the audio data is input to a processor configured to perform ASR which then interprets the utterance based on the similarity between the utterance and pre-established language models 1254 stored in an ASR model knowledge base (ASR Models Storage 1252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (e.g., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1253 stored in an ASR Models Storage 1252), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 1220 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1256 and a speech recognition engine 1258. The acoustic front end (AFE) 1256 transforms the audio data from the microphone into data for processing by the speech recognition engine 1258. The speech recognition engine 1258 compares the speech recognition data with acoustic models 1253, language models 1254, and other data models and information for recognizing the speech conveyed in the audio data. The AFE 1256 may reduce noise in the audio data and divide the digitized audio data into frames representing time intervals for which the AFE 1256 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1258 may process the output from the AFE 1256 with reference to information stored in speech/model storage (1252). Alternatively, post front-end processed data (such as feature vectors) may be received by the device executing ASR processing from another source besides the internal AFE. For example, the user device may process audio data into feature vectors (for example using an on-device AFE 1256) and transmit that information to a server across a network for ASR processing. Feature vectors may arrive at the remote computer system 1200 encoded, in which case they may be decoded prior to processing by the processor executing the speech recognition engine 1258.

The speech recognition engine 1258 attempts to match received feature vectors to language phonemes and words as known in the stored acoustic models 1253 and language models 1254. The speech recognition engine 1258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, add the music to the kitchen," or "Alexa, move the music to the kitchen," or "Alexa, stop the music in the kitchen." The wake detection component may identify the wake word, otherwise described as a trigger expression, "Alexa" in the user utterance and may "wake" based on identifying the wake word. Audio data corresponding to the user utterance may be sent to the remote computer system 1200 where the speech recognition engine 1258 may identify, determine, and/or generate text data corresponding to the user utterance, here "Add the music to the kitchen," "Move the music to the kitchen," or "Stop the music in the kitchen." The speech recognition engine 1258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1258 to other processing components, which may be local to the device performing ASR and/or distributed across the network(s). For example, ASR results in the form of a single textual representation of the speech, an N-best list including multiple hypotheses and respective scores, lattice, etc. may be sent to the remote computer system 1200, for natural language understanding (NLU) processing, such as conversion of the text into commands for execution, either by the user device, by the remote computer system 1200, or by another device (such as a server running a specific application like a search engine, etc.).

The device performing NLU processing may include various components, including potentially dedicated processor(s), memory, storage, etc. As shown in FIG. 12, an NLU component 1230 may include a recognizer 1263 that includes a named entity recognition (NER) component 1262 which is used to identify portions of query text that correspond to a named entity that may be recognizable by the system. A downstream process called named entity resolution links a text portion to a specific entity known to the system. To perform named entity resolution, the system may utilize gazetteer information (1284a-1284n) stored in entity library storage 1282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 1220 based on the utterance input audio 1203) and attempts to make a semantic interpretation of the text. That is, the NLU process determines the meaning behind the text based on the individual words and then implements that meaning. NLU processing interprets a text string to derive an intent or a desired action from the user as well as the pertinent pieces of information in the text that allow a device (e.g., device 1210) to complete that action. For example, if a spoken utterance is processed using ASR and outputs the text "Add music to the kitchen" the NLU process may determine that the user intended for the audio being output by a device also be output by another device associated with the identifier of kitchen.

The NLU may process several textual inputs related to the same utterance. For example, if the ASR outputs N text segments (as part of an N-best list), the NLU may process all N outputs to obtain NLU results.

As will be discussed further below, the NLU process may be configured to parse and tag to annotate text as part of NLU processing. For example, for the text "Move the music to the kitchen," "move" may be tagged as a command (to output audio on a device) and "kitchen" may be tagged as a specific device to output the audio on instead of the previous device.

To correctly perform NLU processing of speech input, an NLU process may be configured to determine a "domain" of the utterance so as to determine and narrow down which services offered by the endpoint device (e.g., remote computer system 1200 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1262 receives a query in the form of ASR results and attempts to identify relevant grammars and lexical information that may be used to construe meaning. To do so, the NLU component may begin by identifying potential domains that may relate to the received query. The NLU storage 1273 includes a database of devices (1274a-1274n) identifying domains associated with specific devices. For example, the user device may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 1263, language model and/or grammar database (1276a-1276n), a particular set of intents/actions (1278a-1278n), and a particular personalized lexicon (1286). Each gazetteer (1284a-1284n) may include domain-indexed lexical information associated with a particular user and/or device. For example, the Gazetteer A (1284a) includes domain-index lexical information 1286aa to 1286an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains ordinarily selected to be the correct result.

An intent classification (IC) component 1264 parses the query to determine an intent or intents for each identified domain, where the intent corresponds to the action to be performed that is responsive to the query. Each domain is associated with a database (1278a-1278n) of words linked to intents. For example, a music intent database may link words and phrases such as "add," "move," "remove," "quiet," "volume off," and "mute" to a "mute" intent. A voice-message intent database, meanwhile, may link words and phrases such as "Send a message," "Send a voice message," "Send the following," or the like. The IC component 1264 identifies potential intents for each identified domain by comparing words in the query to the words and phrases in the intents database 1278. In some instances, the determination of an intent by the IC component 1264 is performed using a set of rules or templates that are processed against the incoming text to identify a matching intent.

In order to generate a particular interpreted response, the NER 1262 applies the grammar models and lexical information associated with the respective domain to actually recognize a mention of one or more entities in the text of the query. In this manner, the NER 1262 identifies "slots" or values (e.g., particular words in query text) that may be needed for later command processing. Depending on the complexity of the NER 1262, it may also label each slot with a type of varying levels of specificity (such as noun, place, city, artist name, song name, device identification, audio identification, audio-session queue identification, or the like). Each grammar model 1276 includes the names of entities (e.g., nouns) commonly found in speech about the particular domain (e.g., generic terms), whereas the lexical information 1286 from the gazetteer 1284 is personalized to the user(s) and/or the device. For instance, a grammar model associated with the shopping domain may include a database of words commonly used when people discuss shopping. In case an entity is not identified for a slot, the NER 1262 can query contextual data, such as contextual data 142 to identify the value.

The intents identified by the IC component 1264 are linked to domain-specific grammar frameworks (included in 1276) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "Add the music to the kitchen" is an identified intent, a grammar (1076) framework or frameworks may correspond to sentence structures such as "Add {audio-session queue} to {kitchen}."

For example, the NER component 1262 may parse the query to identify words as subject, object, verb, preposition, etc., based on grammar rules and/or models, prior to recognizing named entities. The identified verb may be used by the IC component 1264 to identify intent, which is then used by the NER component 1262 to identify frameworks. A framework for the intent of "Play a song," meanwhile, may specify a list of slots/fields applicable to play the identified "song" and any object modifier (e.g., specifying a music collection from which the song should be accessed) or the like. The NER component 1262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1262 may search the database of generic words associated with the domain (in the knowledge base 1272). So, for instance, if the query was "Add the music to the kitchen," after failing to determine which device corresponds to the identify of "kitchen," the NER component 1262 may search the domain vocabulary for device identifiers associated with the word "kitchen." In the alternative, generic words may be checked before the gazetteer information, or both may be tried, potentially producing two different results.

The output data from the NLU processing (which may include tagged text, commands, etc.) may then be sent to a command processor 1207. The destination command processor 1207 may be determined based on the NLU output. For example, if the NLU output includes a command to send a message, the destination command processor 1207 may be a message sending application, such as one located on the user device or in a message sending appliance, configured to execute a message sending command. If the NLU output includes a search request, the destination command processor 1207 may include a search engine processor, such as one located on a search server, configured to execute a search command. After the appropriate command is generated based on the intent of the user, the command processor 1207 may provide some or all of this information to a text-to-speech (TTS) engine. The language output engine may then generate an actual audio file for outputting the audio data determined by the command processor 1207 (e.g., "playing in the kitchen," or "music moved to the kitchen"). After generating the file (or "audio data"), the language output engine may provide this data back to the remote computer system 1200.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component during runtime operations where NLU operations are performed on text (such as text output from an ASR component). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1263. Each recognizer may include various NLU components such as an NER component 1262, IC component 1264 and other components such as an entity resolver, or other components.

For example, a messaging domain recognizer 1263-A (Domain A) may have an NER component 1262-A that identifies what slots (e.g., portions of input text) may correspond to particular words relevant to that domain. The words may correspond to entities such as (for the messaging domain) a recipient. An NER component 1262 may use a machine learning model, such as a domain specific conditional random field (CRF) to both identify the portions corresponding to an entity as well as identify what type of entity corresponds to the text portion. The messaging domain recognizer 1263-A may also have its own intent classification (IC) component 1264-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote computer system 1200, as illustrated herein are exemplary, and may be located in a stand-alone device or may be included, in whole or in part, as a component of a larger device or system, may be distributed across a network or multiple devices connected by a network, etc.

Figure 13:
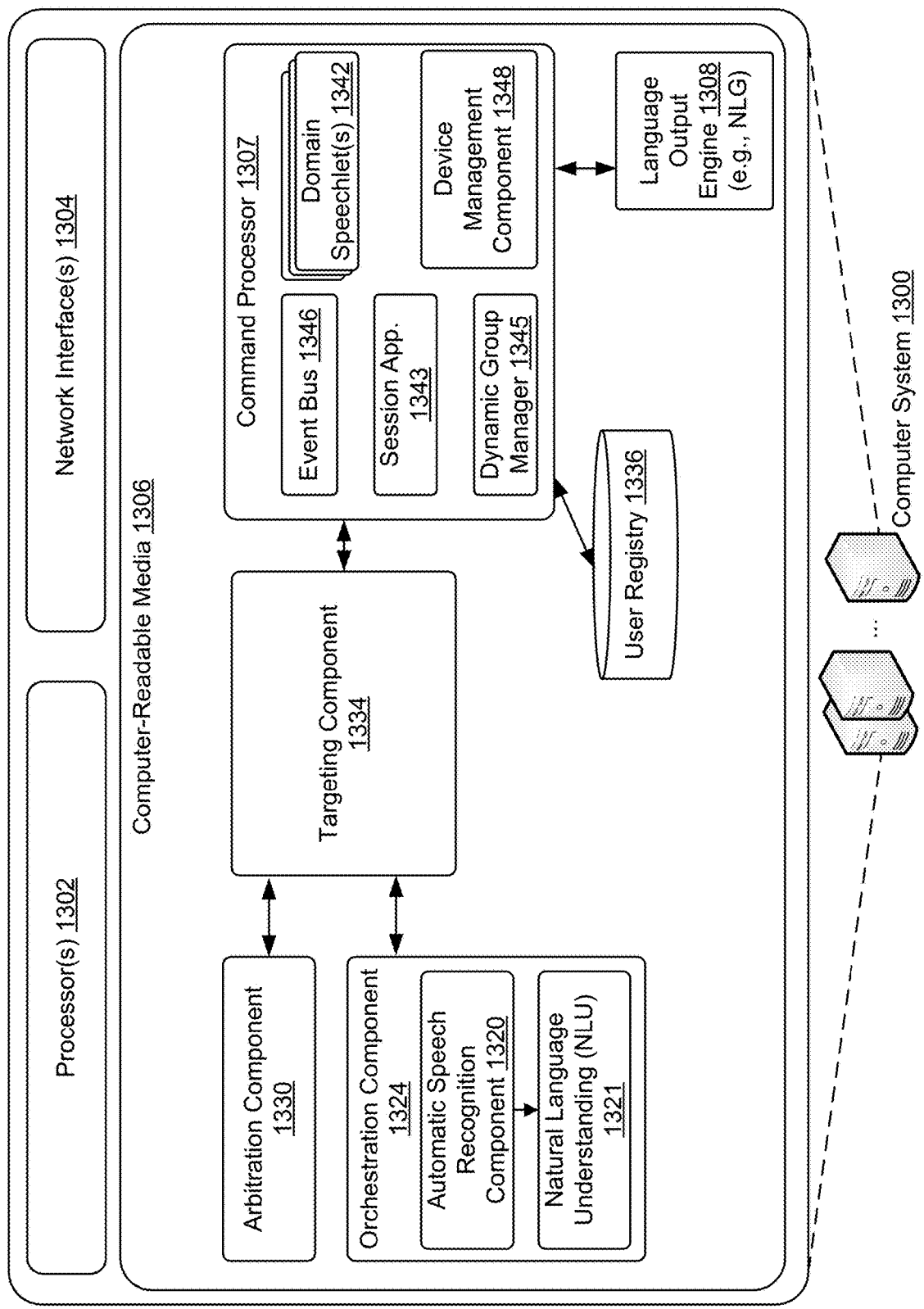
FIG. 13 illustrates an example of components of a computer system, according to embodiments of the present disclosure.

FIG. 13 illustrates a conceptual diagram of components of a computer system 1300 associating audio output commands with multiple devices, including a command processor 1307 configured to generate a command that the selected voice-enabled device uses to respond to a user utterance. As used with respect to FIG. 13, a voice-enabled device may include a device, such as any of the devices described herein above. As illustrated in FIG. 13, the computer system 1300, including the orchestration component 1324 and a speech processing component comprising an ASR component 1320 and an NLU component 1321, may be coupled to a targeting component 1334 and provide the targeting component 1334 with the intent determined to be expressed in the user utterance. Further, the arbitration component 1330 may provide the ranked list of devices to the targeting component 1334, as well as device indicators (e.g., IP addresses, devices names, etc.) for one or more of the voice-enabled devices in the ranked list of devices. The targeting component 1334 may then perform techniques to determine a target device (e.g., a device to perform the requested operation), and provide various data to the command processor 1307. For instance, the targeting component 1334 may provide the command processor 1307 with various device identifiers of the voice-enabled devices, the determined target device, the determined intent and/or command, etc. By way of example, the targeting component 1334 may determine which devices to add to a grouping of device, which devices to remove from a grouping of devices, and/or which devices to move an audio-session to.

The command processor 1307 and/or NLU component 1321 may determine a domain based on the intent and, based on this determination, route the request corresponding to the audio data to the appropriate domain speechlet, such as the illustrated domain speechlets 1342. The domain speechlet 1342 may comprise any type of device or group of devices (e.g., hardware device, virtual devices or partitions, server, etc.), and may receive the text data and/or an intent associated with the audio signals and may determine how to respond to the request. For instance, the intent for a command "Add the music to the kitchen" may be routed to a music domain speechlet 1342, which controls devices, such as speakers, connected to the voice-enabled devices. The music domain speechlet 1342 may determine a command to generate based on the intent of the user to output audio on a device associated with the kitchen identifier as when as continuing to output the audio on another device that is currently outputting the audio. Additionally, the music domain speechlet 1342 may determine additional content, such as audio data, to be output by one of the voice-enabled devices, such as "Kitchen has been added to your audio session."

Various types of domain speechlets 1342 may be used to determine which devices to send commands to and/or to use in response to a user utterance, as well as the appropriate response and potential additional content (e.g., audio data). For example, the domain speechlets 1342 may include a third party skills domain speechlet 1342, which may handle intents associated with gaming, productivity, etc., a music domain speechlet 1342, which may handle intents associated with music play requests, and/or an information domain speechlet 1342, which may handle requests for information associated, for example, with the status of a particular device and/or content being utilized and/or output by a particular device and/or group of devices.

After the domain speechlet 1342 generates the appropriate command, which may be described herein as directive data, based on the intent of the user, and/or provides additional content, such as audio data, to be output by one of the voice-enabled devices, the domain speechlet 1342 may provide this information back to the computer system 1300, which in turns provides some or all of this information to a language output engine 1308. The language output engine 1308 can implement an NLG component and/or a TTS component to generate an actual audio file for outputting the second audio data determined by the domain speechlet 1342. After generating the file (or "audio data"), the language output engine 1308 may provide this data back to the computer system 1300.

The NLG component can generate text for purposes of TTS output to a user. For example the NLG component may generate text corresponding to instructions for a particular action for the user to perform. The NLG component may generate appropriate text for various outputs as described herein. The NLG component may include one or more trained models configured to output text appropriate for a particular input. The text output by the NLG component may become input for the TTS component (e.g., output text data discussed below). Alternatively or in addition, the TTS component may receive text data from a skill component or other system component for output.

The NLG component may include a trained model. The trained model can generate output text data such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the TTS component.

The TTS component may generate audio data (e.g., synthesized speech) from text data using one or more different methods. Text data input to the TTS component may come from a skill component or another component of the system. In one method of synthesis called unit selection, the TTS component matches text data against a database of recorded speech. The TTS component selects matching units of recorded speech and concatenates the units together to form audio data. In another method of synthesis called parametric synthesis, the TTS component varies parameters such as frequency, volume, and noise to create audio data including an artificial speech waveform. Parametric synthesis uses a computerized voice generator, sometimes called a vocoder.

The computer system 1300 may then publish (e.g., write) some or all of this information to an event bus 1346. That is, the computer system 1300 may provide information regarding the initial request (e.g., the speech, the text, the domain/intent, etc.), the response to be provided to the voice-enabled device, or any other information pertinent to the interaction between the voice-enabled device and the computer system 1300 to the event bus 1346.

Within the computer system 1300, one or more components or services, including a contextual data manager 1345, may subscribe to the event bus 1346 so as to receive information regarding interactions between user devices and the computer system 1300. The contextual data manager 1345 can be responsible for maintaining contextual data 1337 in a data store. In the illustrated example, for instance, the device management component 1348 may subscribe to the event bus 1346 and, thus, may monitor information regarding these interactions. In some examples, monitoring information in the event bus 1346 may comprise communications between various components of the computer system 1300. For example, the targeting component 1334 may monitor the event bus 1346 to identify device state data for voice-enabled devices. In some examples, the event bus 1346 may "push" or send indications of events and/or device state data to the targeting component 1334. Additionally, or alternatively, the event bus 1346 may be "pulled" where the targeting component 1334 sends requests to the event bus 1346 to provide an indication of device state data for a voice-enabled device. The event bus 1346 may store indications of the device states for the devices, such as in a database (e.g., user registry 1336), and using the stored indications of the device states, send the device state data for voice-enabled devices to the targeting component 1334. Thus, to identify device state data for a device, the targeting component 1334 may send a request to the event bus 1346 (e.g., event component) to provide an indication of the device state data associated with a device, and receive, from the event bus 1346, the device state data that was requested.

The device management component 1348 functions to monitor information published to the event bus 1346 and identify events that may trigger action. For instance, the device management component 1348 may identify (e.g., via filtering) those events that: (i) come from voice-enabled devices that are associated with secondary device(s) (e.g., have secondary devices in their environments such as televisions, personal computing devices, etc.), and (ii) are associated with supplemental content (e.g., image data, video data, etc.). The device management component 1348 may reference the user registry 1336 to determine which voice-enabled devices are associated with secondary devices, as well as determine device types, states, and other capabilities of these secondary devices. For instance, the device management component 1348 may determine, from the information published to the event bus 1346, an identifier associated with the voice-enabled device making the corresponding request or the voice-enabled device selected to respond to or act upon the user utterance. The device management component 1348 may use this identifier to identify, from the user registry 1336, a user account associated with the voice-enabled device. The device management component 1348 may also determine whether any secondary devices have been registered with the identified user account, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like. For example, the secondary devices may include speakers that may wirelessly communicate with the voice-enabled device and/or one or more other secondary devices, such as personal devices.

The device management component 1348 may determine whether a particular event identified is associated with supplemental content. That is, the device management component 1348 may write, to a datastore, indications of which types of events and/or which primary content or responses are associated with supplemental content. In some instances, the computer system 1300 may provide access to third-party developers to allow the developers to register supplemental content for output on secondary devices for particular events and/or primary content. For example, if a voice-enabled device is to output that the weather will include thunder and lightning, the device management component 1348 may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device to the audio session. In these and other examples, the device management component 1348 may store an association between the primary response or content (e.g., outputting of information regarding the world's largest mammal) and corresponding supplemental content (e.g., the audio data, image data, or the like). In some instances, the device management component 1348 may also indicate which types of secondary devices are to output which supplemental content. For instance, in the instant example, the device management component 1348 may store an indication that secondary devices of a class type "tablet" are to output a picture of a blue whale. In these and other instances, meanwhile, the device management component 1348 may store the supplemental content in association with secondary-device capabilities (e.g., devices with speakers output the audio commentary, devices with screens output the image, etc.).

The device management component 1348 may also determine how to transmit response and/or supplement content (and/or information acquiring the content) to the voice-enabled devices and/or the secondary devices. To make this determination, the device management component 1348 may determine a device type of the voice-enabled devices and/or secondary devices, capabilities of the device(s), or the like, potentially as stored in the user registry 1336. In some instances, the device management component 1348 may determine that a particular device is able to communicate directly with the computer system 1300 (e.g., over WiFi) and, thus, the device management component 1348 may provide the response and/or content directly over a network to the secondary device (potentially via the computer system 1300). In another example, the device management component 1348 may determine that a particular secondary device is unable to communicate directly with the computer system 1300, but instead is configured to communicate with a voice-enabled device in its environment over short-range wireless networks. As such, the device management component 1348 may provide the supplement content (or information) to the computer system 1300, which in turn may send this to the voice-enabled device, which may send the information over a short-range network to the secondary device.

The computer-readable media 1306 may further include the user registry 1336 that includes data regarding user profiles as described herein. The user registry 1336 may be located in part of, or proximate to, the computer system 1300, or may otherwise be in communication with various components, for example over the network. The user registry 1336 may include a variety of information related to individual users, accounts, etc. that interact with the voice-enabled devices, and the computer system 1300. For illustration, the user registry 1336 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 1336 may store indications of associations between various voice-enabled devices and/or secondary device, such as virtual clusters of devices, states of devices, and associations between devices and audio-session queues. The user registry 1336 may represent clusters of devices and/or as single devices that can receive commands and disperse the commands to each device and/or in the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the command processor 1307 and/or the domain speechlets 1342 may determine, based on the stored device states in the user registry 1336, a current device state of the voice-enabled devices. Rather than receiving device states for the voice-enabled devices, in metadata, the device states may already have been determined or received and stored in the user registry 1336. Further, the user registry 1336 may provide indications of various permission levels depending on the user. As an example, the computer system 1300 may perform speaker recognition on audio signals to determine an identity of the speaker. If the speaker is a child, for instance, the child profile may have permission restrictions where they are unable to request audio to be output via certain devices and/or to output certain audio on one or more of the devices, for example. Conversely, a parent profile may be able to direct output of audio without restrictions. In some examples, to determine the device state, the event bus 1346 may publish different events which indicate device states to various entities or components that subscribe to the event bus 1346. For instance, if an event of "Play music" occurs for a voice-enabled device, the event bus 1346 may publish the indication of this event, and thus the device state of outputting audio may be determined for the voice-enabled device. Thus, various components, such as the targeting component 1334, may be provided with indications of the various device states via the event bus 1346. The event bus 1346 may further store and/or update device states for the voice-enabled devices in the user registry 1336. The components of the computer system 1300 may query the user registry 1336 to determine device states.

A particular user profile may include a variety of data that may be used by the computer system 1300. For example, a user profile may include information about what voice-enabled devices are associated with the user and/or user profile. The user profile may further indicate an IP address for each of the devices associated with the user and/or user profile, user IDs for the devices, indications of the types of devices, and current device states for the devices.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A system comprising:
one or more processors; and
one or more memory storing computer-readable instructions that, upon execution by the one or more processors, configure the system to:
receive, from a device, first audio data corresponding to a first natural language input, the first natural language input associated with a session identifier of a conversation that requests a function;
cause the device to present a first audio output to the first natural language input, the first audio output associated with the session identifier and requesting a value of a parameter associated with an execution of the function;
receive, from the device and prior to the execution of the function, second audio data corresponding to a second natural language input, the second natural language input associated with the session identifier;
determine, by at least using the second audio data as input to speech processing, that the second audio data corresponds to a request to pause the conversation;
cause the device to output a graphical user interface (GUI) component indicating that the conversation is paused, the GUI component being selectable to resume the conversation;
receive, from the device, second data indicating a selection of the GUI component;
cause the device to present a second audio output in response to the selection of the GUI component, the second audio output associated with the session identifier, indicating that the conversation is resumed, and requesting the value of the parameter;
receive, from the device, third audio data corresponding to a third natural language input, the third natural language input associated with the session identifier;
determine, by at least using the third audio data as input to speech processing, the value of the parameter;
cause the execution of the function by at least sending the value of the parameter to a computing component that executes the function; and
cause the device to present a third audio output indicating the execution of the function.

2. The system of claim 1, wherein the one or more memory store additional computer-readable instructions that, upon execution by the one or more processors, further configure the system to:
store contextual data associated with the session identifier, the contextual data indicating an intent to execute the function, a slot that is to be resolved by the speech processing and that corresponds to the parameter, and a state of an interaction model that controls audio outputs;
send, to the device, a first portion of the contextual data indicating the intent, wherein the GUI component presents first information about the intent; and
send, to the device, a second portion of the contextual data indicating the slot, wherein the second audio output indicates the slot.

3. The system of claim 2, wherein the contextual data further indicates an application executing on the device, wherein the first portion further indicates the application, and wherein the one or more memory store additional computer-readable instructions that, upon execution by the one or more processors, further configure the system to:
send, to the device, an object that comprises the first portion, and wherein the GUI component is presented based on the object and indicates the application.

4. A computer-implemented method comprising:
receiving, from a first device, first data corresponding to a first input associated with a conversation, a plurality of inputs and outputs to indicate at least a parameter of a function prior to an execution of the function being associated with the conversation;
causing, prior to the execution of the function, the first device to present a first output, the first output associated with the conversation and requesting a value of the parameter;
determining, prior to the value being indicated, that the conversation is to be paused;
storing contextual data associated with the conversation;
determining that the conversation is to be resumed;
causing, based at least in part on the contextual data, a presentation of a second output, the second output associated with the conversation and requesting the value of the parameter;
receiving second data corresponding to a second input associated with the conversation;
determining the value based at least in part on the second data; and
causing the execution of the function based at least in part on the value.

5. The computer-implemented method of claim 4, further comprises:
causing the first device to output a text-to-speech (TTS) message indicating that the conversation is paused.

6. The computer-implemented method of claim 4, further comprising:
causing the first device to output a graphical user interface (GUI) component indicating that the conversation is paused; and
receiving, from the first device, third data indicating an interaction with the GUI component, wherein the determining that the conversation is to be resumed is based at least in part on the third data,
wherein causing the presentation of the second output comprises causing a second device to output a text-to-speech (TTS) message requesting the value of the parameter, wherein the second device is at least one of the first device or a different device.

7. The computer-implemented method of claim 4, further comprising:
receiving, after causing the first device to present the first output and prior to determining that the conversation is to be paused, audio data from the first device; and
determining, by at least using the audio data as input to speech processing, a request to pause the conversation.

8. The computer-implemented method of claim 4, wherein determining that the conversation is to be paused comprises at least one of:
(i) receiving, after causing the first device to present the first output, audio data from the first device, and determining, by at least using the audio data as input to speech processing, a request for a different function;
(ii) determining that no additional data corresponding to an additional input is received during a time period after causing the first device to present the first output; or
(iii) determining that the conversation is associated with a first application, and determining third data indicating a user interaction with a second application after causing the first device to present the first output.

9. The computer-implemented method of claim 4, wherein determining that the conversation is to be paused further comprises:
determining a state of an interaction model that controls the outputs, wherein the state is based at least in part on a number of inputs associated with the conversation and a number of parameters that are associated with the execution of the function and for which values have been determined.

10. The computer-implemented method of claim 4, further comprises:
causing the first device to output a first indication that the conversation is paused;
receiving, after causing the first device to output the first indication and prior to determining that the conversation is to be resumed, third data from a second device, the second device being at least one of the first device or a different device;
determining that the third data indicates a first request to resume the conversation;
determining, based at least in part on the first request, the parameter from the contextual data; and
sending, to the second device, fourth data indicating a second request to define the value, wherein the fourth data causes the second device to present the second output.

11. The computer-implemented method of claim 10, further comprising:
storing, based at least in part on determining that the conversation is to be paused, first session data indicating that the conversation is paused, the first session data associated with a session identifier;
associating the session identifier with the contextual data;
storing, based at least in part on determining that the conversation is to be resumed, second session data indicating that the conversation is resumed, the second session data associated with the session identifier; and
determining the contextual data based at least in part on the session identifier and the second session data.

12. The computer-implemented method of claim 4, further comprising:
sending, to the first device, third data that includes a portion of the contextual data, wherein the third data causes the first device to present a graphical user interface (GUI) component indicating the function;
receiving, from the first device, fourth data indicating an interaction with the GUI component; and
determining, based at least in part on the fourth data, a request to resume the conversation.

13. A system comprising:
one or more processors; and
one or more memory storing computer-readable instructions that, upon execution by the one or more processors, configure the system to:
receive, from a first device, first data corresponding to a first input associated with a conversation, a plurality of inputs and outputs to indicate at least a parameter of a function prior to an execution of the function being associated with the conversation;

cause, prior to the execution of the function, the first device to present a first output, the first output associated with the conversation and requesting a value of the parameter;

determine, prior to the value being indicated, that the conversation is to be paused;

store contextual data associated with the conversation;

determine that the conversation is to be resumed;

cause, based at least in part on the contextual data, a presentation of a second output, the second output associated with the conversation and requesting the value of the parameter;

receive second data corresponding to a second input associated with the conversation;

determine the value based at least in part on the second data; and cause the execution of the function based at least in part on the value.

14. The system of claim 13, wherein the one or more memory store additional computer-readable instructions that, upon execution by the one or more processors, further configure the system to:

send, to a second device and after determining that the conversation is to be resumed, a first portion of the contextual data, wherein the first portion indicates the parameter and causes the second device to present the second output.

15. The system of claim 14, wherein the contextual data further indicates an intent to execute the function and a state of an interaction model that controls audio responses in the conversation, wherein the one or more memory store further computer-readable instructions that, upon execution by the one or more processors, additionally configure the system to:

send, to the first device and after determining that the conversation is to be paused, a second portion of the contextual data, wherein the second portion indicates the intent to execute the function and causes the first device to present a graphical user interface component that indicates the function.

16. The system of claim 13, wherein the one or more memory store further computer-readable instructions that, upon execution by the one or more processors, additionally configure the system to:

receive, from the first device, third data indicating a first request to pause the conversation;

associate the first request with a first user identifier;

receive, from a second device, fourth data indicating a second request to pause the conversation, wherein the second device is at least one of the first device or a different device;

associate the second request with a second user identifier; and determine that resuming the conversation is authorized based at least in part on the first user identifier and the second user identifier.

17. The system of claim 16, wherein the one or more memory store additional computer-readable instructions that, upon execution by the one or more processors, further configure the system to:

associate the contextual data with the first user identifier and the second user identifier;

determine the parameter from the contextual data based at least in part on the second user identifier; and cause the second device to output a second response requesting the value of the parameter.

18. The system of claim 13, wherein the one or more memory store further computer-readable instructions that, upon execution by the one or more processors, additionally configure the system to:

determine that the conversation is associated with a first application; and send, to a second device, third data that causes the second device to present a first graphical user interface (GUI) component, wherein the first GUI component indicates that the conversation is paused and the first application, and wherein the second device is at least one of the first device or a different device.

19. The system of claim 18, wherein the one or more memory store other computer-readable instructions that, upon execution by the one or more processors, additionally configure the system to:

cause the second device to output a second GUI component indicating that another conversation associated with a second application is also paused; and receive, from the second device, fourth data indicating an interaction with the first GUI component, wherein determining that the conversation is to be resumed is based at least in part on the fourth data.

20. The system of claim 13, wherein the one or more memory store additional computer-readable instructions that, upon execution by the one or more processors, further configure the system to:

set a state of a session associated with the conversation to a first value, the first value indicating that the session is ongoing; and set, based at least in part on the determining that the conversation is to be paused, the state to a second value, the second value indicating that the session is paused.

* * * * *